US009519697B2

(12) United States Patent
Inakoshi et al.

(10) Patent No.: US 9,519,697 B2
(45) Date of Patent: Dec. 13, 2016

(54) OBSERVATION INFORMATION PROCESSING APPARATUS, NON-TRANSITORY COMPUTER-READABLE RECORDING MEDIUM, AND OBSERVATION INFORMATION PROCESSING METHOD

(71) Applicant: FUJITSU LIMITED, Kawasaki-shi, Kanagawa (JP)

(72) Inventors: Hiroya Inakoshi, Tama (JP); Tatsuya Asai, Kawasaki (JP); Hiroaki Morikawa, Kawasaki (JP); Shinichiro Tago, Shinagawa (JP); Nobuhiro Yugami, Minato (JP); Seishi Okamoto, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 386 days.

(21) Appl. No.: 14/227,547

(22) Filed: Mar. 27, 2014

(65) Prior Publication Data

US 2014/0210820 A1 Jul. 31, 2014

Related U.S. Application Data

(63) Continuation of application No. PCT/JP2012/054283, filed on Feb. 22, 2012, and a
(Continued)

(51) Int. Cl.
*G06F 17/30* (2006.01)
*G06Q 30/02* (2012.01)
(Continued)

(52) U.S. Cl.
CPC ......... *G06F 17/30572* (2013.01); *G06F 17/30* (2013.01); *G06F 17/30539* (2013.01);
(Continued)

(58) Field of Classification Search
None
See application file for complete search history.

(56) References Cited

U.S. PATENT DOCUMENTS

| 5,991,752 A | 11/1999 | Fukuda et al. |
| 2002/0059273 A1 | 5/2002 | Morimoto et al. |

(Continued)

FOREIGN PATENT DOCUMENTS

| JP | 10-240747 A | 9/1998 |
| JP | 2001-337956 A | 12/2001 |

(Continued)

OTHER PUBLICATIONS

Wei Wang, Jiong Yang, Richard Muntz, "STING: A Statistical Information Grid Approach to Spatial Data Mining", Feb. 27, 1997, Morgan Kaufmann Publishers Inc, Proceeding VLDB '97 Proceedings of the 23rd International Conference on Very Large Data Bases, pp. 186-195.*

(Continued)

*Primary Examiner* — Robert Bader
(74) *Attorney, Agent, or Firm* — Fujitsu Patent Center

(57) ABSTRACT

An observation information processing apparatus calculates, for each mesh, a support and a confidence. The observation information processing apparatus generates an adjacent mesh set by merging adjacent ones of the meshes. The observation information processing apparatus calculates, based on a support and a confidence of each mesh included in the adjacent mesh set, a confidence for each adjacent mesh, and sets the smallest one of the confidences calculated as a new confidence threshold value. The observation information processing apparatus detects and excludes meshes to be excluded from meshes included in the adjacent mesh set, based on the confidences and supports of the meshes included in the adjacent mesh set and the confidence threshold value.

5 Claims, 23 Drawing Sheets

Related U.S. Application Data continuation of application No. PCT/JP2011/072572, filed on Sep. 30, 2011.

(51) Int. Cl.
  *G06T 17/20* (2006.01)
  *G06T 17/05* (2011.01)

(52) U.S. Cl.
  CPC ..... *G06Q 30/0205* (2013.01); *G06Q 30/0252* (2013.01); *G06Q 30/0261* (2013.01); *G06T 17/05* (2013.01); *G06T 17/20* (2013.01); *G06F 2216/03* (2013.01)

(56) References Cited

U.S. PATENT DOCUMENTS

2004/0080510 A1 4/2004 Inokuchi et al.
2009/0327342 A1* 12/2009 Xiao ................ G06F 17/30241

FOREIGN PATENT DOCUMENTS

| JP | 2004-102428 A | 4/2004 |
| JP | 2005-084930 A | 3/2005 |
| JP | 2010-250496 A | 11/2010 |

OTHER PUBLICATIONS

Takeshi Fukuda, Yasuhiko Morimoto, Shinichi Morishita, Takeshi Tokuyama, "Mining Optimized Association Rules for Numeric Attributes", 1999, Academic Press, Journal of Computer and System Sciences 58, 1-12.*

Robert Bembenik, Henryk Rybinski, "FABRICS: a method of mining spatial association rules and collections using clustering and Delaunay diagrams", Aug. 2009, Springer, Journal of Intelligent Information Systems, vol. 33, Issue 1, pp. 41-64.*

Takeshi Fukuda et al., "Data Mining Using Two-Dimensional Optimized Association Rules: Scheme, Algorithms, and Visualization", pp. 13-23, SIGMOD '96.

Rajeev Rastogi et al., "Mining Optimized Association Rules with Categorical and Numeric Attributes", IEEE Transactions on Knowledge and Data Engineering, vol. 14, No. 1, Jan./Feb. 2002, pp. 29-50.

Yoshio Sugiura, "Geographical Spacial Analysis (Chiri-Kunkan-Bunseki)", Asakura Books, 2003 p. 48, 1.3-p50, 119.

International Search Report, mailed in connection with PCT/JP2012/054283 and mailed May 22, 2012.

Yoshio Sugiura, "Geographical Spacial Analysis (Chiri-Kukan-Bunseki)", Asakura Books, 2003, p. 48, 1.3-p. 50, 1.19 (Partial translation attached), and p. 51-p. 59.

* cited by examiner

FIG.2
| TIME (t) | COORDINATES (x,y) | ATTRIBUTE 1 (v) | ATTRIBUTE 2 (w) |
|---|---|---|---|
| $t_1$ | $x_1,y_1$ | $v_1$ | $w_1$ |
| $t_2$ | $x_2,y_2$ | $v_2$ | $w_2$ |
| $t_3$ | $x_3,y_3$ | $v_3$ | $w_3$ |
| $t_4$ | $x_4,y_4$ | $v_4$ | $w_4$ |
| $t_5$ | $x_5,y_5$ | $v_5$ | $w_5$ |
| $t_6$ | $x_6,y_6$ | $v_6$ | $w_6$ |
| ⋮ | ⋮ | ⋮ | ⋮ |
130a
FIG.3
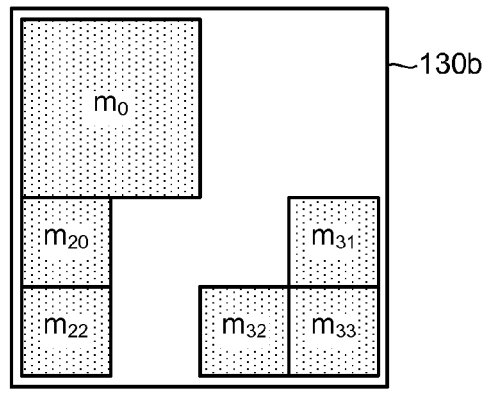
130b
FIG.4
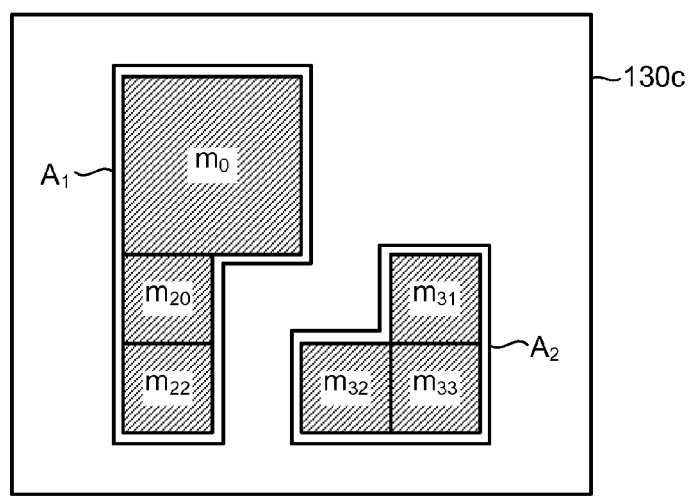
130c

FIG.5

| MESH IDENTIFICATION INFORMATION | NUMBER OF RECORDS | SUPPORT | SUPPORT× CONFIDENCE | CONFIDENCE |
|---|---|---|---|---|
| $m_0$ | 24 | 20 | 13 | 0.65 |
| $m_1$ | 28 | 24 | 0 | 0.00 |
| $m_{20}$ | 33 | 15 | 9 | 0.60 |
| $m_{21}$ | 32 | 14 | 0 | 0.00 |
| $m_{22}$ | 26 | 16 | 13 | 0.81 |
| $m_{23}$ | 29 | 24 | 0 | 0.00 |
| $m_{30}$ | 29 | 24 | 0 | 0.00 |
| $m_{31}$ | 26 | 19 | 13 | 0.68 |
| $m_{32}$ | 22 | 18 | 13 | 0.72 |
| $m_{33}$ | 31 | 19 | 14 | 0.74 |

130f

FIG.6
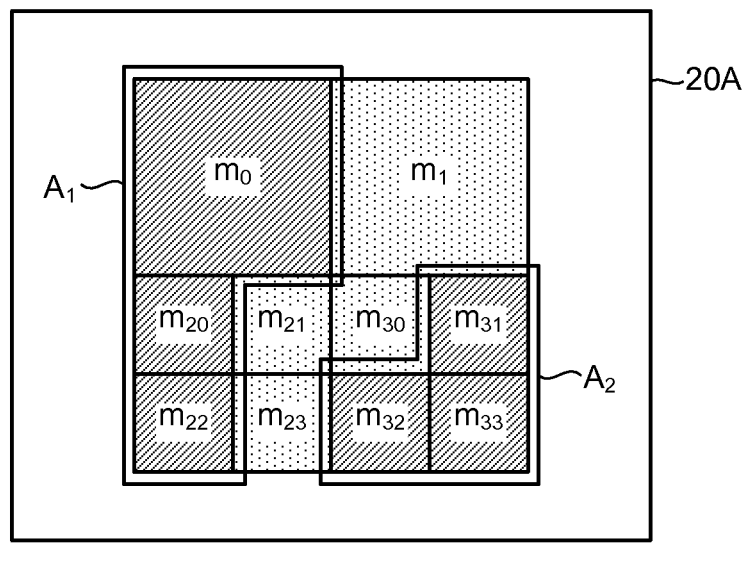
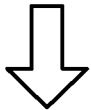
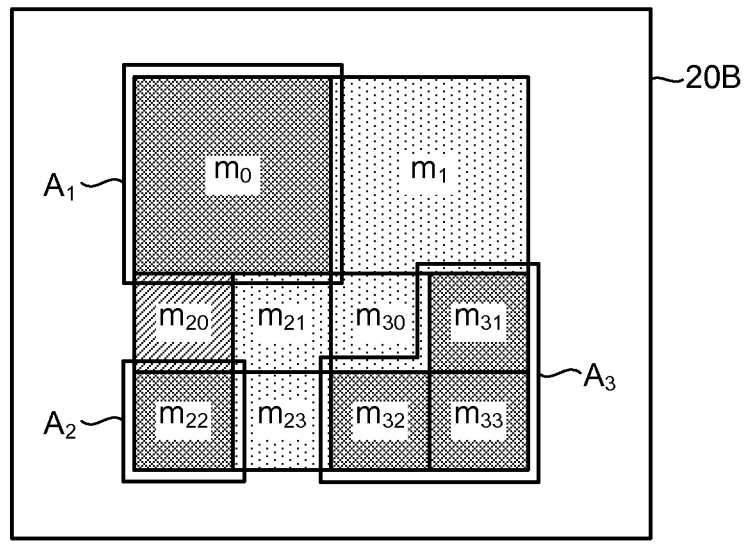

| MESH IDENTIFICATION INFORMATION | NUMBER OF RECORDS | SUPPORT | SUPPORT× CONFIDENCE | CONFIDENCE |
|---|---|---|---|---|
| $m_0$ | 24 | 20 | 13 | 0.65 |
| $m_1$ | 28 | 24 | 0 | 0.00 |
| $m_{20}$ | 33 | 15 | 9 | 0.60 |
| $m_{21}$ | 32 | 14 | 0 | 0.00 |
| $m_{22}$ | 26 | 16 | 13 | 0.81 |
| $m_{23}$ | 29 | 24 | 0 | 0.00 |
| $m_{30}$ | 29 | 24 | 0 | 0.00 |
| $m_{31}$ | 26 | 19 | 13 | 0.68 |
| $m_{32}$ | 22 | 18 | 13 | 0.72 |
| $m_{33}$ | 31 | 19 | 14 | 0.74 |

FIG.10

| MESH IDENTIFICATION INFORMATION | NUMBER OF RECORDS | SUPPORT | SUPPORT× CONFIDENCE | CONFI-DENCE | $s_c c_c / \min s_c$ |
|---|---|---|---|---|---|
| $m_0$ | 24 | 20 | 13 | 0.65 | 0.93 |
| $m_1$ | 28 | 24 | 0 | 0.00 | 0.00 |
| $m_{20}$ | 33 | 15 | 9 | 0.60 | 0.64 |
| $m_{21}$ | 32 | 14 | 0 | 0.00 | 0.00 |
| $m_{22}$ | 26 | 16 | 13 | 0.81 | 0.93 |
| $m_{23}$ | 29 | 24 | 0 | 0.00 | 0.00 |
| $m_{30}$ | 29 | 24 | 0 | 0.00 | 0.00 |
| $m_{31}$ | 26 | 19 | 13 | 0.68 | 0.87 |
| $m_{32}$ | 22 | 18 | 13 | 0.72 | 0.87 |
| $m_{33}$ | 31 | 19 | 14 | 0.74 | 0.93 |

| MESH IDENTIFICATION INFORMATION | NUMBER OF RECORDS | SUPPORT | SUPPORT× CONFIDENCE | CONFI-DENCE | $s_c c_c / \min s_c$ |
|---|---|---|---|---|---|
| $m_0$ | 24 | 20 | 13 | 0.65 | 0.93 |
| $m_{20}$ | 33 | 15 | 9 | 0.60 | 0.64 |
| $m_{22}$ | 26 | 16 | 13 | 0.81 | 0.93 |
| $m_{31}$ | 26 | 19 | 13 | 0.68 | 0.87 |
| $m_{32}$ | 22 | 18 | 13 | 0.72 | 0.87 |
| $m_{33}$ | 31 | 19 | 14 | 0.74 | 0.93 |

130f

| MESH IDENTIFICATION INFORMATION | NUMBER OF RECORDS | SUPPORT | SUPPORT× CONFIDENCE | CONFI-DENCE | $s_c c_c / \min s_c$ |
|---|---|---|---|---|---|
| $m_0$ | 24 | 20 | 13 | 0.65 | 0.93 |
| $m_{22}$ | 26 | 16 | 13 | 0.81 | 0.93 |
| $m_{31}$ | 26 | 19 | 13 | 0.68 | 0.87 |
| $m_{32}$ | 22 | 18 | 13 | 0.72 | 0.87 |
| $m_{33}$ | 31 | 19 | 14 | 0.74 | 0.93 |

| MESH IDENTIFICATION INFORMATION | NUMBER OF RECORDS | SUPPORT | SUPPORT× CONFIDENCE | CONFI-DENCE | $s_c c_c / \min s_c$ |
|---|---|---|---|---|---|
| $m_0$ | 24 | 20 | 13 | 0.65 | 0.93 |
| $m_{31}$ | 26 | 19 | 13 | 0.68 | 0.87 |
| $m_{32}$ | 22 | 18 | 13 | 0.72 | 0.87 |
| $m_{33}$ | 31 | 19 | 14 | 0.74 | 0.93 |

FIG.23

| MESH IDENTIFICATION INFORMATION | SUPPORT | SUPPORT× CONFIDENCE | CONFIDENCE |
|---|---|---|---|
| $m_0$ | 1 | 0.65 | 0.65 |
| $m_1$ | 1 | 0.00 | 0.00 |
| $m_2$ | 1 | 0.60 | 0.60 |
| $m_3$ | 1 | 0.00 | 0.00 |
| $m_4$ | 1 | 0.81 | 0.81 |
| $m_5$ | 1 | 0.00 | 0.00 |
| $m_6$ | 1 | 0.00 | 0.00 |
| $m_7$ | 1 | 0.68 | 0.68 |
| $m_8$ | 1 | 0.72 | 0.72 |
| $m_9$ | 1 | 0.74 | 0.74 |

230e

OBSERVATION INFORMATION PROCESSING APPARATUS, NON-TRANSITORY COMPUTER-READABLE RECORDING MEDIUM, AND OBSERVATION INFORMATION PROCESSING METHOD

CROSS-REFERENCE TO RELATED APPLICATION

This application is a continuation application of International Application No. PCT/JP2011/072572, filed on Sep. 30, 2011 and designated the U.S., the entire contents of which are incorporated herein by reference. This application is a continuation application of International Application No. PCT/JP2012/054283, filed on Feb. 22, 2012 and designated the U.S., the entire contents of which are incorporated herein by reference. Further, it is noted that International Application No. PCT/JP2012/054283 is based upon and claims the benefit of priority from the prior International Application No. PCT/JP2011/072572, filed on Sep. 30, 2011.

FIELD

The embodiments discussed herein are directed to an observation information processing apparatus and the like.

BACKGROUND

Conventionally, data aggregation is performed by dividing an area into meshes. FIGS. 31 and 32 are diagrams illustrating examples of such data aggregation. In FIG. 31, a certain region 10a is divided in meshes per town-and-district (town-and-Chome) and FIG. 32 is divided in meshes each merged of four adjacent ones of the meshes in FIG. 31. <0} In FIGS. 31 and 32, the darker the color of a mesh is, the larger the population in that mesh is.

Comparing FIGS. 31 and 32, for the same region 10a, different results are obtained depending on how the division into meshes is made. For example, in FIG. 31, the north of a railroad 10b appears to be more populated. On the contrary, in FIG. 32, the south of the railroad 10b appears to be more populated. Such a change in the obtained results depending on how the division into meshes is made is called the modifiable areal unit problem.

For the above mentioned conventional technique, another conventional technique, in which an association rule is set and an area maximized with a confidence of the association rule is detected, exists. In this conventional technique, because the way of dividing into meshes is not predetermined, the modifiable areal unit problem does not occur.

For example, see: SUGIURA, Yoshio, "Geographical Spacial Analysis (Chiri-Kukan-Bunseki)", Asakura Books, 2003; FUKUDA, T., et. al, "Data mining using two-dimensional optimized association rules", SIGMOD '96; and RASTOGI, R., "Mining optimized association rules with categorical and numeric attribute", *IEEE Trans. On Knowledge and Data Engineering*, Vol. 14, Issue 1, 2002.

However, the above described conventional technique has the problem of not being able to detect an area having a locally maximum confidence related to the association rule.

FIG. 33 is a diagram illustrating a concept of local maxima. For example, the horizontal axis corresponds to position and the vertical axis corresponds to confidence. Points $1a$ to $1d$ in FIG. 33 represent local maximum points. The local maximum point $1a$ is a point where the value is maximum in a neighborhood $2a$. At the local maximum point $1a$, the value changes from increase to decrease. Similarly, the local maximum points $1b$ to $1d$ are points where the value becomes maximum in neighborhoods $2b$ to $2d$, respectively.

In the conventional technique, an area having the maximum confidence is detected. The problem in the conventional technique is that as illustrated in FIG. 33, an area corresponding to the local maximum point $1a$ is detected in the conventional technique because confidence becomes the largest at the local maximum point $1a$. However, in the conventional technique, areas corresponding to the remaining local maximum points $1b$ to $1d$ are not detectable.

For example, in an example where data are aggregated for areas in which many people, who have taken taxis, take long distance rides, it will be convenient if not only an area in which a possibility of a long distance ride being taken is the largest, but also an area in which the possibility is locally maximum are concurrently presentable. This is because, for example, in the area with the locally maximum possibility, the possibility of being able to pick up a long distance ride customer is not the largest, but there is a higher possibility, than in a current spot where a taxi is currently traveling, of being able to pick up a long distance ride customer near the current spot. However, in the conventional technique, only an area in which the possibility of a long distance ride being taken is the largest is detectable.

SUMMARY

According to an aspect of an embodiment, a observation information processing apparatus, includes a memory; and a processor coupled to the memory, wherein the processor executes a process comprising: calculating, for each mesh, a support that is a number of records for which a condition part of an association rule becomes true in records included in a mesh, based on meshes each associated with records each including observation information having information identifying a geographical position and an event that occurs at the geographical position, the information being associated with the event; calculating, for each mesh, a confidence that is a ratio of records for which a conclusion part of the association rule also becomes true, to the records for which the condition part becomes true; generating an adjacent mesh set by merging adjacent ones of the meshes; calculating a confidence for each adjacent mesh based on the support and confidence of each mesh included in the adjacent mesh set; setting the smallest one of the confidences calculated as a new confidence threshold value; excluding meshes to be excluded from meshes included in the adjacent mesh set, based on the confidences and supports of the meshes included in the adjacent mesh set and the confidence threshold value; and repeatedly executing each process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a data structure of a data table according to the first embodiment;

FIG. 3 is a diagram illustrating an example of a data structure of a mesh set data;

FIG. 4 is a diagram illustrating an example of a data structure of an adjacent mesh set data;

FIG. 5 is a diagram illustrating an example of a data structure of a mesh aggregation table;

FIG. 6 is a diagram for explaining key points of a control unit;

FIG. 10 is a third diagram for explaining a process by the control unit according to the first embodiment;

FIG. 23 is a diagram illustrating an example of a data structure of a mesh aggregation table according to the second embodiment;

DESCRIPTION OF EMBODIMENTS

Preferred embodiments of the present invention will be explained with reference to accompanying drawings. The invention is not limited by the embodiments.

[a] First Embodiment

Figure 1:
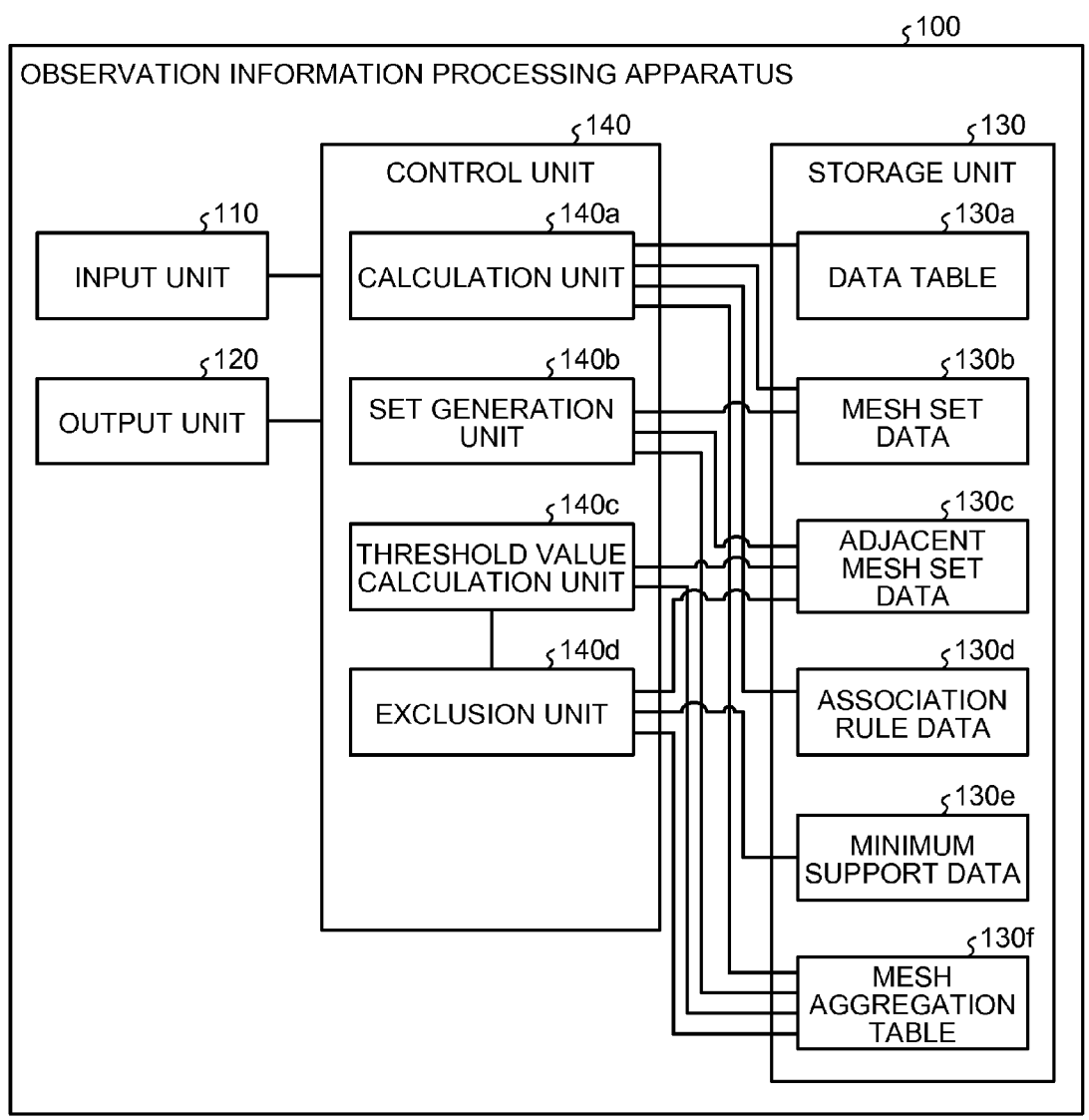
FIG. 1 is a functional block diagram illustrating a configuration of an observation information processing apparatus according to a first embodiment of the present invention.

An example of a configuration of an observation information processing apparatus according to a first embodiment will be described. In the first embodiment, an example in which areas where many long distance taxi rides are taken are extracted will be described. FIG. 1 is a functional block diagram illustrating the configuration of the observation information processing apparatus according to the first embodiment of the present invention. As illustrated in FIG. 1, this observation information processing apparatus 100 has an input unit 110, an output unit 120, a storage unit 130, and a control unit 140.

The input unit 110 is an input device that inputs various data. For example, a user uses the input unit 110 to input a data table 130a, a mesh set data 130b, an association rule data 130d, minimum support data 130e, and the like. The input unit 110 corresponds to a key board, a mouse, a touch panel, or the like. The output unit 120 is an output device that outputs a result of a process by the control unit 140. For example, the output unit 120 corresponds to a display, a touch panel, or the like.

The storage unit 130 stores therein the data table 130a, the mesh set data 130b, and an adjacent mesh set data 130c. Further, the storage unit 130 stores therein the association rule data 130d, the minimum support data 130e, and a mesh aggregation table 130f. The storage unit 130, for example, corresponds to a semiconductor memory element such as a random access memory (RAM), a read only memory (ROM), or a flash memory, or to a storage device such as a hard disk or an optical disk.

The data table 130a has a plurality of records, each record including a time (t), a set of coordinates (x, y), an attribute 1 (v), and an attribute 2 (w). For example, the data table 130a is defined as "D=((t, x, y, v, w))". The "t" is defined as "t∈T (time)". The "x" and "y" are defined as "(x, y)∈$R^2$ (coordinates)". The "v" and "w" are defined as "v, w∈Z (integer, real number, item value)".

FIG. 2 is a diagram illustrating an example of a data structure of a data table according to the first embodiment. As illustrated in FIG. 2, the data table 130a is stored with a time (t), a set of coordinates (x, y), an attribute 1 (v), and an attribute 2 (w) in association with one another.

For example, to the attribute 1 (v), a value is set according to whether or not a taxi has been taken. If taken, "1" is set to the attribute 1 (v). If gotten off, "0" is set to the attribute 1 (v).

To the attribute 2 (w), a value is set according to whether or not the ride is of a long distance or not. If the ride is of a long distance, "l" is set. If the ride is of a short distance, "0" is set.

A mesh set data 130b is a data of mesh sets. A mesh set is defined as "M={$m_c$|$m_c \cap m_d$=φ if c≠d}". That is, meshes, which are elements of a mesh set, do not overlap one another. Further, an adjacency relation is defined with respect to a pair of meshes that are elements of a mesh set. That is, two different meshes $m_c$ and $m_d$ being adjacent to each other is denoted as "$m_c$~$m_d$". For example, $m_c$ and $m_d$ sharing a boundary line may be denoted as "$m_c$~$m_d$". As long as the meshes do not overlap one another and have adjacency relations defined therefor, shapes of the meshes are not limited to rectangular shapes, and sizes thereof may be different from one another.

A mesh and a mesh set each represent a set of records therein and thus are each treated equivalently to a record set. If "$S=\{(t, x, y, v, w)|(x, y) \in m_c\}$", being called a record set $m_c$ instead of a record set "S" is acceptable. Further, "$\exists m_c \in Ms. t.(x, y) \in m_c$" is simply written as "$(x, y) \in M$". If "$S=\{(t, x, y, v, w)|x, y) \in M\}$", they may each be called a record set "M" instead of a record set "S".

FIG. 3 is a diagram illustrating an example of a data structure of a mesh set data. In the example illustrated in FIG. 3, the mesh set data 130b has meshes $m_0$, $m_{20}$, $m_{22}$, $m_{31}$, $m_{32}$ and $m_{33}$. Herein, for the purpose of illustration, rectangular meshes are drawn, but limitation is not to be made thereto. Further, each mesh has an adjacency relation defined therefor. For example, meshes $m_0$ and $m_{20}$ as well as meshes $m_{20}$ and $m_{22}$ are defined to be adjacent to each other. Further, meshes $m_{31}$ and $m_{33}$, as well as meshes $m_{32}$ and $m_{33}$ are defined to be adjacent to each other.

The adjacent mesh set data 130c is a data of adjacent mesh sets. An adjacent mesh set is a set including only all of meshes that are reachable by following the adjacency relations. An adjacent mesh set is defined as "$A_j = \{m_c | m_c \sim^* m_d, \exists d \neq c\}$". Herein, "$\sim^*$" means a transitive closure of the adjacency relation "$\sim$". FIG. 4 is a diagram illustrating an example of a data structure of an adjacent mesh set data. In the example illustrated in FIG. 4, the adjacent mesh set data 130c has adjacent mesh sets $A_1$ and $A_2$. The adjacent mesh set $A_1$ has meshes $m_0$, $m_{20}$, and $m_{22}$. The adjacent mesh set $A_2$ has meshes $m_{31}$, $m_{32}$, and $m_{33}$.

The association rule data 130d is a data of an association rule. For example, an association rule is defines as "$C_1(t, x, y, v, w) \rightarrow C_2(t, x, y, v, w)$". In this association rule, "$C_1$" is called a condition part. Further, $C_2$ is called a conclusion part. Further, "$\rightarrow$" in the association rule means an implication. The condition part $C_1$ and the conclusion part $C_2$ are arbitrary logical expressions related to arguments. If an argument is given, the logical expression becomes either of {T(true), F(false)}. Hereinafter, as appropriate, the condition part $C_1$ is simply denoted as $C_1$ and the conclusion part $C_2$ is simply denoted as $C_2$.

In the first embodiment, as an example, the condition part $C_1$ is a logical expression that becomes "T" when the attribute 1 (v) is "1" and "F" when the attribute 1 (v) is "0". Further, the conclusion part $C_2$ is a logical expression that becomes "T" when the attribute 2 (w) is "1" and "F" when the attribute 2 (w) is "0".

The minimum support data 130e is a data of the minimum support (minSup). A minimum support is a constant that the user presets. The later described control unit 140 uses the minimum supports upon detection of an area having a locally maximum confidence related to the association rule. The description related to the support will be made later.

The mesh aggregation table 130f is used by the later described control unit 140 upon the detection of the area having the locally maximum confidence related to the association rule. FIG. 5 is a diagram illustrating an example of a data structure of a mesh aggregation table. As illustrated in FIG. 5, this mesh aggregation table 130f has mesh identification information, the number of records, the support, the value of "support×confidence", and the confidence in association with one another. The mesh identification information is information that identifies a mesh uniquely. The number of records represents the number of records included in a mesh. The description related to the support and the confidence will be made later.

Next, before the control unit 140 is described, terms will be defined.

A size of a set will be now defined. A size of a set is the number of elements belonging to a set "S". The size of a set is denoted as "|S|".

A size of a subset that satisfies a logical expression will now be described. In a record set "S", a size of a subset satisfying a logical expression "C" is defined as follows.

$$\#(C|S)=|\{(t,x,y,v,w)|(t,x,y,v,w) \in S \wedge C(t,x,y,v,w)=T\}|$$

Since "mesh" and "record set" are equivalent to each other, the following definitions may be made.

$$\#(C|m_c)=|\{(t,x,y,v,w)|(x,y) \in m_c \wedge C(t,x,y,v,w)=T\}|$$

$$\#(C|A_j)=|\{(t,x,y,v,w)|(x,y) \in A_j \wedge C(t,x,y,v,w)=T\}|$$

Description of the support will now be made. A support is the number of records, in a record set S, for which the condition part $C_1$ of the association rule becomes true. The support is defined as follows.

$$\sup(C_1 \rightarrow C_2|S)=\#(C_1|S)$$

If only one association rule is treated, the support is denoted as "sup(S)" as appropriate. Since "mesh" and "record set" are equivalent to each other, the following definitions may be made.

$$\sup(m_c)=\#(C|m_c)$$

$$\sup(A_j)=\#(C|A_j)$$

Description of the confidence will now be made. The confidence is a ratio, to the records for which the condition part $C_1$ of the association rule becomes true, of records for which the conclusion part $C_2$ also becomes true. The confidence is defined as follows.

$$\mathrm{conf}(C_1 \rightarrow C_2|S)=\#(C_1 \wedge C_2|S)/\#(C_1|S)$$

If only one association rule is treated, the confidence is denoted as conf(S) as appropriate.

The support and confidence have the following relation.

$$\sup(C_1 \rightarrow C_2|S)\mathrm{conf}(C_1 \rightarrow C_2|S)=\#(C_1 \wedge C_2|S)$$

Since "mesh" and "record set" are equivalent to each other, the following definitions may be made.

$$\mathrm{conf}(m_c)=\#(C_1 \wedge C_2|m_c)/\#(C_1|m_c)$$

$$\mathrm{conf}(A_j)=\#(C_1 \wedge C_2|A_j)/\#(C_1|A_j)$$

An area of a locally maximum confidence will now be described. An adjacent mesh set $A_j$ satisfying the following properties is said to have a locally maximum confidence.

$$\sup(A_j) > \mathrm{minSup} \text{ AND}$$

$$\mathrm{conf}(A_i) < \mathrm{conf}(A_j) \text{ for } \forall A_i \supset A_j$$

Next, a process by the control unit 140 will be explained. The control unit 140 obtains, through the input unit 110, the data table 130a, the mesh set data 130b, the association rule data 130d, and the minimum support data 130e.

The control unit 140 calculates a support and a confidence of each mesh from the data table 130a. The control unit 140, while updating a confidence threshold value, detects and excludes meshes to be excluded, from meshes included in an adjacent mesh set, based on the confidence threshold value and the confidence and support of each mesh included in the adjacent mesh set.

Description will be made on key points of a process by the control unit 140, of excluding the meshes based on the confidence threshold value. FIG. 6 is a diagram for explaining the key points of the control unit 140. As a premise, as indicated by "20A", adjacent mesh sets $A_1$ and $A_2$ are supposed as having been detected.

The adjacent mesh set $A_1$ includes meshes $m_0$, $m_{20}$, and $m_{22}$.

$$A_1 = \{m_0, m_{20}, m_{22}\}$$

The adjacent mesh set $A_2$ includes meshes $m_{31}$, $m_{32}$, and $m_{33}$.

$$A_2 = \{m_{31}, m_{32}, m_{33}\}$$

A support of a mesh $m_c$ is $s_c = \sup(m_c)$ and a confidence thereof is $c_c = \text{conf}(m_c)$. The confidence threshold value (minConf) is defined as follows. The confidence threshold value is the minimum confidence in confidences of the adjacent mesh set $A_1$ and confidences of the adjacent mesh set $A_2$.

$$\text{minConf} = \min\{\text{conf}(A_1), \text{conf}(A_2)\}$$

A minimum support value ($\text{mins}_c$) is defined as follows. The minimum support value is the minimum support of $s_0$, $s_{20}$, $s_{22}$, $s_{31}$, $s_{32}$, and $s_{33}$.

$$\text{mins}_c = \min\{s_0, s_{20}, s_{22}, s_{31}, s_{32}, s_{33}\}$$

Herein, even if a mesh that does not satisfy the following condition is present in an adjacent mesh set, the confidence of that adjacent mesh set does not increase.

$$s_c c_c / \text{mins}_c \geq \text{minConf}$$

The control unit 140 excludes, from the meshes included in the adjacent mesh sets $A_1$ and $A_2$, meshes that do not satisfy the condition. For example, if the mesh $m_{20}$ of the adjacent mesh set $A_1$ does not satisfy the condition, the control unit 140 excludes the mesh $m_{20}$ from the adjacent mesh set $A_1$.

When the control unit 140 excludes the mesh $m_{20}$ from the adjacent mesh set $A_1$, "20B" illustrated in FIG. 6 is obtained. As depicted by "20B" of FIG. 6, adjacent mesh sets $A_1$, $A_2$, and $A_3$ are obtained. The control unit 140, by repeatedly executing the process described with respect to FIG. 6, detects an area of a locally maximum confidence.

Description will be made with reference to FIG. 1 again. The control unit 140 has a calculation unit 140a, a set generation unit 140b, a threshold value calculation unit 140c, and an exclusion unit 140d. The control unit 140, for example, corresponds to an integrated device such as an application specific integrated circuit (ASIC) or a field programmable gate array (FPGA). Further, the control unit 140, for example, corresponds to an electronic circuit such as a CPU, or a micro processing unit (MPU).

The calculation unit 140a is a processing unit that aggregates records for each mesh and calculates the number of records, the support, and the confidence, based on the data table 130a and the mesh set data 130b. The calculation unit 140a stores, in the mesh aggregation table 130f, the mesh identification information, the number of records, the support, the value of "support×confidence", and the confidence in association with one another.

The calculation unit 140a compares the coordinates in the data table 130a with the area of the mesh of the mesh set data 130b and calculates the number of records included in the mesh. Further, the calculation unit 140a calculates the support, which is the number of records for which the condition part $C_1$ of the association rule becomes "T", in the records included in the mesh. Further, for the records included in the mesh, the calculation unit 140a calculates the confidence, which is the ratio of records for which the conclusion part $C_2$ also becomes "T" to those records for which the condition part $C_1$ of the association rule becomes "T". Further, by multiplying the support by the confidence, the calculation unit 140a calculates the value of "support× confidence".

The set generation unit 140b is a processing unit that generates the adjacent mesh set data 130c, based on the mesh set data 130b and the mesh aggregation table 130f. The set generation unit 140b groups, based on the adjacency relations defined by the mesh set data 130b, meshes corresponding to mesh identification information remaining in the mesh aggregation table 130f, to generate the adjacent mesh set data 130c.

The threshold value calculation unit 140c calculates the confidence for each adjacent mesh set, based on the adjacent mesh set data 130c and the mesh aggregation table 130f. The threshold value calculation unit 140c outputs, the minimum one of the confidences calculated, as the confidence threshold value, to the exclusion unit 140d.

The exclusion unit 140d is a processing unit that detects and excludes the meshes to be excluded, based on the adjacent mesh set data 130c, the mesh aggregation table 130f, and the minimum support data 130e.

A process by the exclusion unit 140d will be explained. The exclusion unit 140d compares each support in the mesh aggregation table 130f and determines the minimum support ($\text{minS}_c$). The exclusion unit 140d calculates a value "$s_c c_c / \text{mins}_c$" by dividing the value of "support×confidence" in the mesh aggregation table 130f by "$\text{mins}_c$". The exclusion unit 140d calculates the value of "$s_c c_c / \text{mins}_c$" for each mesh identification information in the mesh aggregation table 130f.

The exclusion unit 140d detects, as a target to be excluded, mesh identification information for which the values of "$s_c c_c / \text{mins}_c$" are less than the confidence threshold value. The exclusion unit 140d excludes the records corresponding to the detected mesh identification information from the mesh aggregation table 130f.

The exclusion unit 140d performs a process of deleting $m_c \in A_i$ for which $\sup(A_i) < \text{minSup}$.

The calculation unit 140a, the set generation unit 140b, the threshold value calculation unit 140c, and the exclusion unit 140d, which are included in the control unit 140, perform the above mentioned process repeatedly until there is no more mesh to be deleted.

Figure 7:
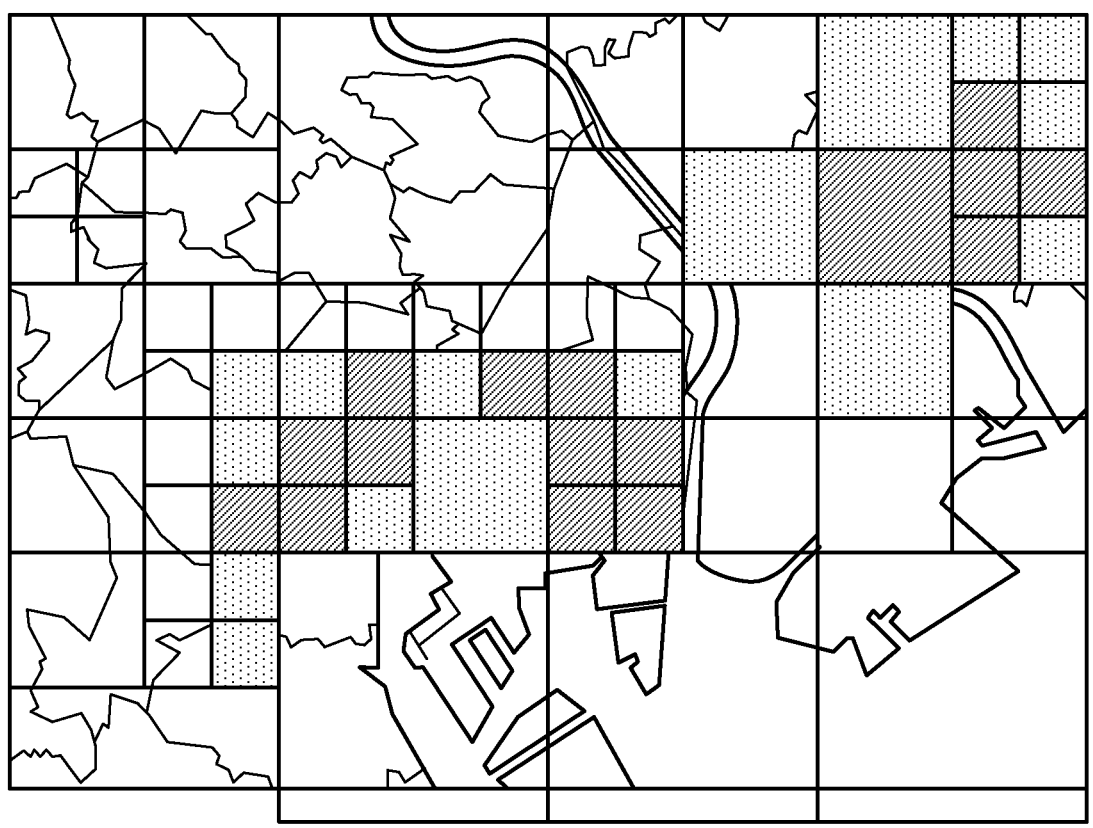
FIG. 7 is a diagram illustrating an example of an output result of an output unit.

For example, the exclusion unit 140d overlaps the adjacent mesh sets remaining in the adjacent mesh set data 130c with a map data for output via the output unit 120. FIG. 7 is a diagram illustrating an example of an output result by an output unit. The exclusion unit 140d may output the mesh-excluded meshes while gradually changing the color darker. In this case, the meshes displayed in a dark color correspond to the areas with locally maximum confidences. Further, instead of constantly outputting the meshes, the exclusion unit 140d may, as illustrated in FIG. 7, display the meshes excluded the time before last in a light color and the meshes excluded last in a dark color. A parent-child relation of a tree is of a contour-like relation on a two-dimensional plane. The control unit 140 may output the parent-child relation of the tree in a contour-like format.

Next, the process by the control unit 140 will be described in more detail. FIGS. 8 to 16 are diagrams for explaining the process by the control unit according to the first embodiment. Herein, the data table 130a is assumed to be the one illustrated in FIG. 2, and initial values of the mesh set data 130b are assumed to be like those illustrated FIG. 8. Further, the minimum support (minSup) of the minimum support data 130e is assumed to be set to "16".

Figures 8, 9:
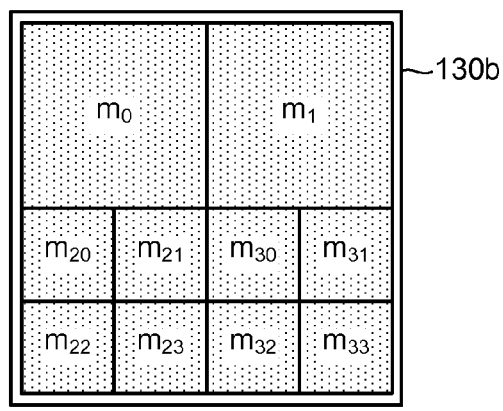
FIG. 8 is a first diagram for explaining a process by the control unit according to the first embodiment.
FIG. 9 is a second diagram for explaining a process by the control unit according to the first embodiment.

The control unit 140 uses the calculation unit 140a to generate, based on the data table 130a and the mesh set data 130b, the mesh aggregation table 130f. The mesh aggregation table 130f thus generated is illustrated in FIG. 9.

The control unit 140 initializes variables "M" and "A" as follows. The variable "M" corresponds to the meshes remaining in the mesh aggregation table 130f. The variable "A" corresponds to an adjacent mesh set. The numbers appended at the upper right of the variables "M" and "A" each indicate the number of loops. Initially, the number of loops is zero.

$$M^{(0)} = M = \{m(m_0, m_1, m_{20}, m_{21}, m_{22}, m_{23}, m_{30}, m_{31}, m_{32}, m_{33}\}$$

$$A^{(0)} = \{\{m_0, m_1, m_{20}, m_{21}, m_{22}, m_{23}, m_{30}, m_{31}, m_{32}, m_{33}\}\} = \{A^{(0)}_1\}$$

The control unit 140 uses the threshold value calculation unit 140c to update the confidence threshold value, based on the adjacent mesh set data 130c and the mesh aggregation table 130f. The confidence threshold value is found as follows and becomes "0.39".

$$\text{minConf} = \min\{(13+0+9+0+13+0+0+13+13+14)/(20+24+15+14+16+24+24+19+18+19)\} = 0.39$$

The control unit 140 uses the exclusion unit 140d to find, from each of the supports in the mesh aggregation table 130f, the minimum support ($\text{mins}_c$) to be "14". The control unit 140 calculates $s_c c_c / \text{mins}_c$ for each mesh identification information, and registers the calculated values in the mesh aggregation table 130f. The mesh aggregation table 130f thus generated is illustrated in FIG. 10.

Figures 11, 12:
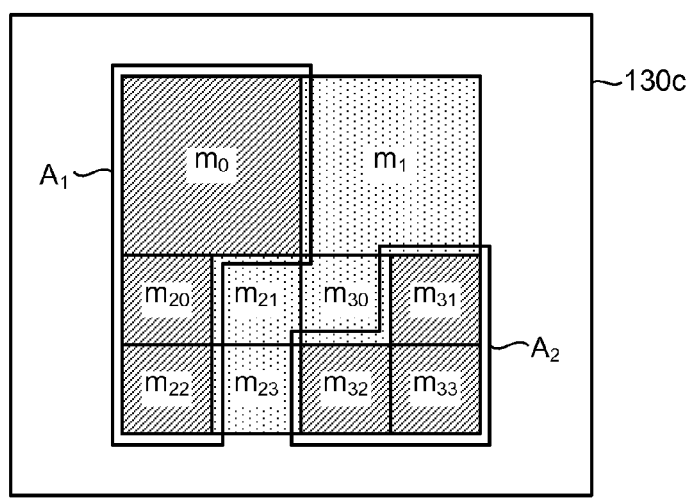
FIG. 11 is a fourth diagram for explaining a process by the control unit according to the first embodiment.
FIG. 12 is a fifth diagram for explaining a process by the control unit according to the first embodiment.

The control unit 140 further uses the exclusion unit 140d to detect and exclude records having the values of "$s_c c_c / \text{mins}_c$" that are less than the confidence threshold value (0.39), from the mesh aggregation table 130f illustrated in FIG. 10. In the example illustrated in FIG. 10, the records corresponding to the mesh identification information $m_1$, $m_{21}$, $m_{23}$, and $m_{30}$ are excluded, and the mesh aggregation table 130f thus generated is illustrated in FIG. 11.

The control unit 140 uses the set generation unit 140b to execute a mesh merging process, based on the mesh identification information remaining in the mesh aggregation table 130f and the mesh set data 130b and updates the adjacent mesh set data 130c. As illustrated in FIG. 12, by the control unit 140 executing the mesh merging process, adjacent mesh sets $A^{(1)}_1$ and $A^{(1)}_2$ are obtained. Further, the control unit 140 updates the variables "M" and "A" as follows.

$$A^{(1)}_1 = \{m_0, m_{20}, m_{22}\}$$

$$A^{(1)}_2 = \{m_{31}, m_{32}, m_{33}\}$$

$$A^{(1)} = \{A^{(1)}_1, A^{(1)}_2\}$$

$$M^{(1)} = \{m_0, m_{20}, m_{22}, m_{31}, m_{32}, m_{33}\}$$

The control unit 140 continues the process because at least one mesh has been excluded by the exclusion unit 140d and the last variable $M^{(0)}$ and the current variable $M^{(1)}$ are different from each other.

The control unit 140 uses the threshold value calculation unit 140c to update the confidence threshold value, based on the adjacent mesh set data 130c and the mesh aggregation table 130f. The confidence threshold value is found as follows and becomes "0.69".

$$\text{minConf} = \min\{\text{conf}(A^{(1)}_1), \text{conf}(A^{(1)}_2)\} =$$
$$\min\{(13+9+13)/(20+15+16), (13+13+14)/(19+18+19)\} = 0.69$$

The control unit 140 uses the exclusion unit 140d to find, from each of the supports in the mesh aggregation table 130f, the minimum support ($\text{mins}_c$) to be "16".

Figures 13, 14, 15:
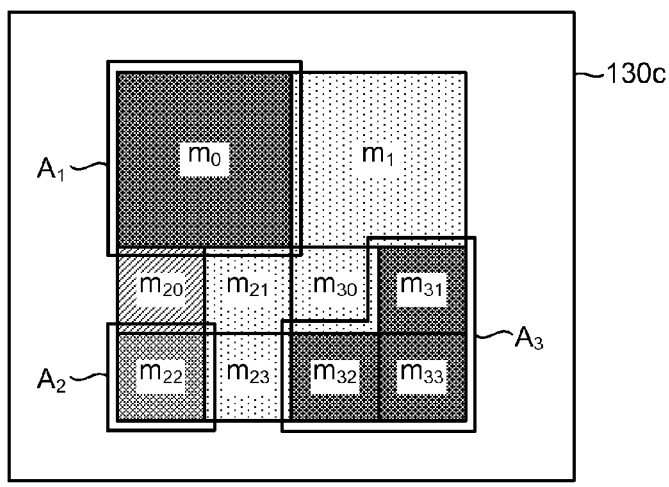
FIG. 13 is a sixth diagram for explaining a process by the control unit according to the first embodiment.
FIG. 14 is a seventh diagram for explaining a process by the control unit according to the first embodiment.
FIG. 15 is an eighth diagram for explaining a process by the control unit according to the first embodiment.

The control unit 141 further uses the exclusion unit 140d to detect and exclude records having the values of $s_c c_c / \text{mins}_c$ that are less than the confidence threshold value (0.69), from the mesh aggregation table 130f illustrated in FIG. 11. In the example illustrated in FIG. 11, the records corresponding to the mesh identification information $m_{20}$ are excluded and the mesh aggregation table 130f thus obtained is illustrated in FIG. 13.

The control unit 140 uses the set generation unit 140b to execute a mesh merging process, based on the mesh identification information remaining in the mesh aggregation table 130f and the mesh set data 130b and updates the adjacent mesh set data 130c. As illustrated in FIG. 14, by the control unit 140 executing the mesh merging process, adjacent mesh sets $A^{(2)}_1$, $A^{(2)}_2$, and $A^{(2)}_3$ are obtained. Further, the control unit 140 updates the variables "M" and "A" as follows.

$$A^{(2)}_1 = \{m_0\}$$

$$A^{(2)}_2 = \{m_{22}\}$$

$$A^{(2)}_3 = \{m_{31}, m_{32}, m_{33}\}$$

$$A^{(2)} = \{A^{(2)}_1, A^{(2)}_2, A^{(2)}_3\}$$

$$M^{(2)} = \{m_0, m_{22}, m_{31}, m_{32}, m_{33}\}$$

The support of the adjacent mesh set $A^{(2)}_2$ is equal to or less than the minimum support "16", and thus the control unit 140 excludes the mesh identification information $m_{22}$ from the variable "M" and mesh aggregation table 130f. The variable "M" is thus obtained as follows and the mesh aggregation table 130f thus obtained is illustrated in FIG. 15.

$$M^{(2)} = \{m_0, m_{31}, m_{32}, m_{33}\}$$

The control unit 140 continues the process because at least one mesh has been excluded by the exclusion unit 140d and the last variable $M^{(2)}$ and the current variable $M^{(1)}$ are different from each other.

The control unit 140 uses the threshold value calculation unit 140c to update the confidence threshold value, based on the adjacent mesh set data 130c and the mesh aggregation table 130f. The confidence threshold value is found as follows and becomes "0.65".

$$\text{minConf} = \min\{\text{conf}(A^{(2)}_1), \text{conf}(A^{(2)}_2), \text{conf}(A^{(2)}_3)\} =$$
$$\min\{0.65, 0.81, (13+13+14)/(19+18+19)\} = 0.65$$

The control unit 140 uses the exclusion unit 140d to find, from each of the supports in the mesh aggregation table 130f, the minimum support ($\text{mins}_c$) to be "16".

The control unit 140 further uses the exclusion unit 140d to detect and exclude records having the values of $s_c c_c / \text{mins}_c$ that are less than the confidence threshold value (0.65), from the mesh aggregation table 130f illustrated in FIG. 15. In the example illustrated in FIG. 15, there are no such records, and thus exclusion of records is not performed.

Figure 16:
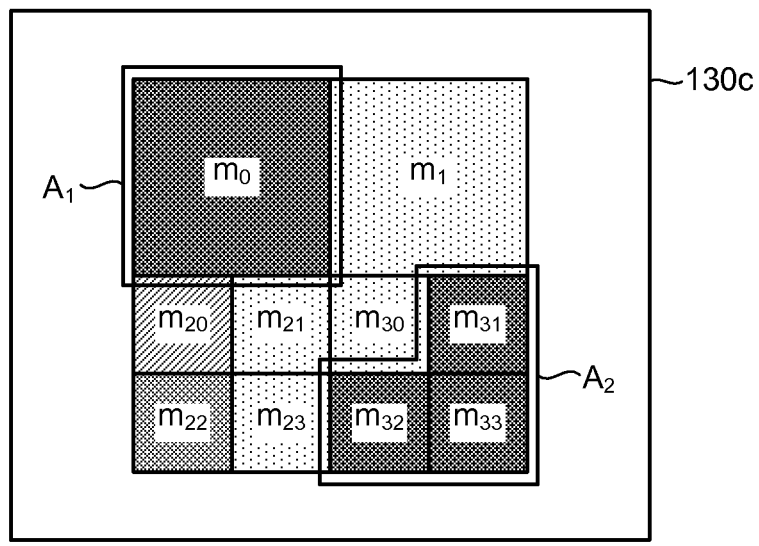
FIG. 16 is a ninth diagram for explaining a process by the control unit according to the first embodiment.

The control unit 140 uses the set generation unit 140b to execute a mesh merging process, based on the mesh identification information remaining in the mesh aggregation table 130f and the mesh set data 130b and updates the adjacent mesh set data 130c. As illustrated in FIG. 16, by the control unit 140 executing the mesh merging process, adjacent mesh sets $A^{(3)}_1$ and $A^{(3)}_2$ are obtained. Further, the control unit 140 updates the variables "M" and "A" as follows. Since the values of $\sup(A^{(3)}_1)$ and $\sup(A^{(3)}_2)$ are greater than minSup, these are not excluded.

$$A^{(3)}_1 = \{m_0\}$$

$$A^{(3)}_2 = \{m_{31}, m_{32}, m_{33}\}$$

$$A^{(3)} = \{A^{(3)}_1, A^{(3)}_2\}$$

$$M^{(3)} = \{m_0, m_{31}, m_{32}, m_{33}\}$$

The control unit 140 ends the process because no mesh is excluded by the exclusion unit 140d and the current variable $M^{(3)}$ and the last variable $M^{(2)}$ are the same.

Figure 17:
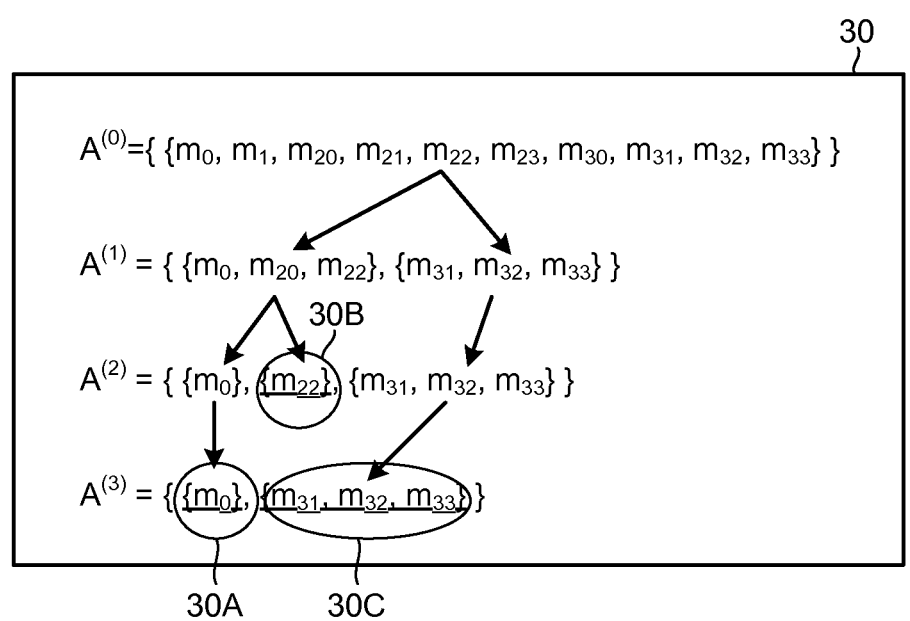
FIG. 17 is a diagram illustrating an example of a tree structure of adjacent mesh sets.

The control unit 140 forms a tree structure using the adjacent mesh sets $A^{(0)}$, $A^{(1)}$, $A^{(2)}$ and $A^{(3)}$. FIG. 17 is a diagram illustrating an example of a tree structure of adjacent mesh sets. In a tree structure 30 illustrated in FIG. 17, leaf portions 30A to 30C are areas having locally maximum confidences. Accordingly, the control unit 140 causes the output unit 120 to display the areas corresponding to the leaf portions 30A to 30C in a dark color. Further, the control unit 140 may display areas corresponding to the meshes $m_0$, $m_{31}$, $m_{32}$, and $m_{33}$, which have been excluded the time before last, in a light color.

Figure 18:
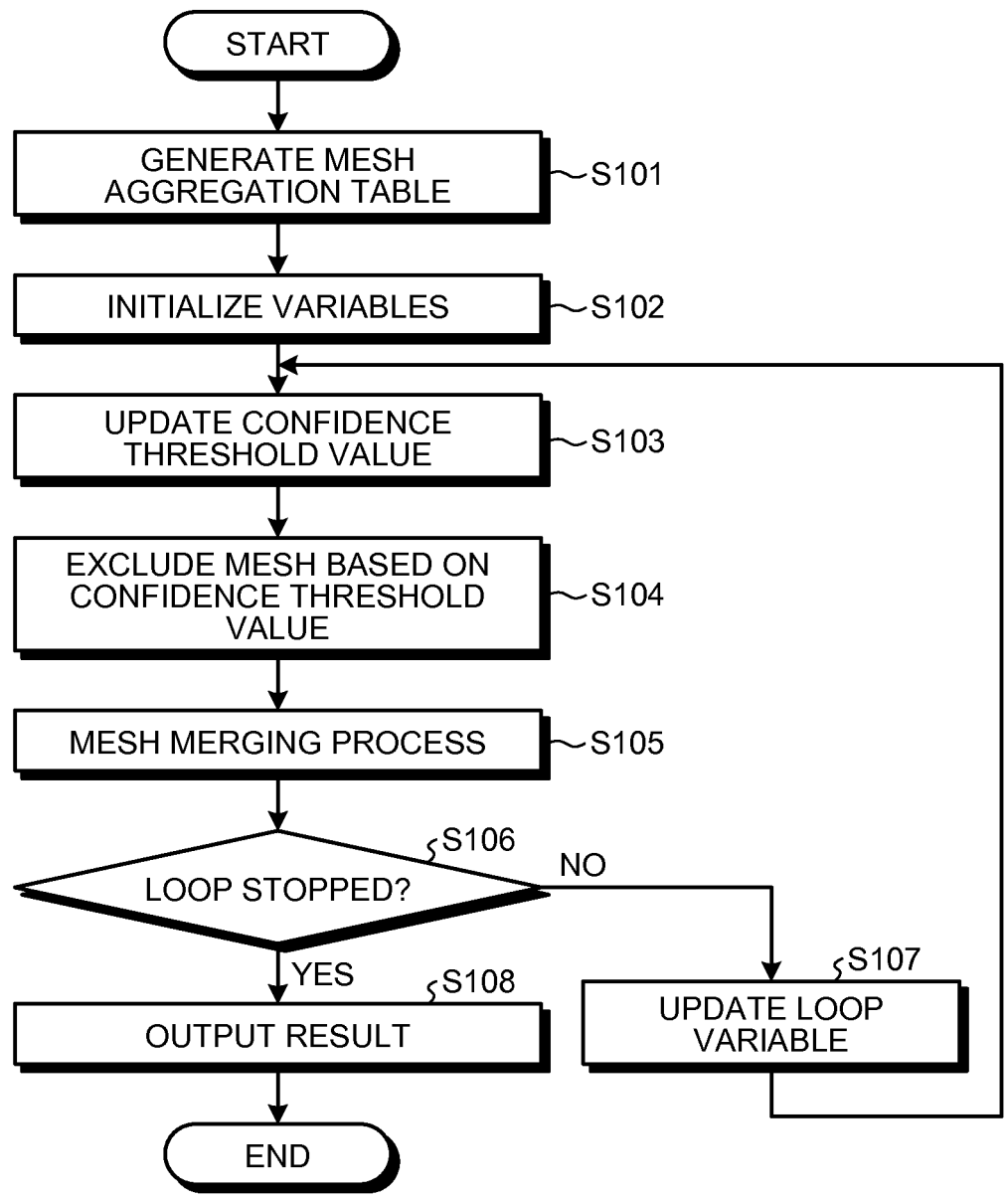
FIG. 18 is a flow chart illustrating a sequence of a process by the observation information processing apparatus according to the first embodiment.

Next, a sequence of a process by the observation information processing apparatus 100 according to the first embodiment will be described. FIG. 18 is a flow chart illustrating the sequence of the process by the observation information processing apparatus according to the first embodiment. Execution of the process illustrated in FIG. 18 is triggered, for example, by reception, via the input unit 110, of the data table 130a, the mesh set data 130b, the association rule data 130d, and the minimum support data 130e.

As illustrated in FIG. 18, the observation information processing apparatus 100 generates the mesh aggregation table 130f (Step S101). At Step S101, the observation information processing apparatus 100 calculates, for all $m_c \in M$, $s_c = \sup(m_c)$ and $c_c = \text{conf}(m_c)$.

The observation information processing apparatus 100 initializes the variables (Step S102). At Step S102, the observation information processing apparatus 100 sets the initial mesh set as $M^{(0)} = M$, the initial adjacent mesh set as $A^{(0)} = \{M^{(0)}\}$, and a loop variable as $k=1$.

The observation information processing apparatus 100 updates the confidence threshold value (Step S103). At Step S103, the observation information processing apparatus 100 calculates the confidence threshold value by the equation "$\text{minConf} = \min_{A_j \in A(k-1)} \text{conf}(A_j)$".

The observation information processing apparatus 100 excludes meshes based on the confidence threshold value (Step S104). At Step S104, the observation information processing apparatus 100 leaves those satisfying the following condition in the mesh aggregation table 130f and excludes those not satisfying the condition.

$$M^{(k)} = \{m_c | m_c \in M^{(k-1)} s \cdot t \ s_c c_c / \min_{m_c \in M(k-1)} s_c \geq \text{minConf}\}$$

The observation information processing apparatus 100 performs a mesh merging process (Step S105). At Step S105, the observation information processing apparatus 100 sets the adjacent mesh set $A^{(k)}$ and the mesh set $M^{(k)}$, as follows.

$$A^{(k)}\{A_j | A_j \subset M^{(k)s \cdot t \cdot m}{}_c \sim m_d \text{iff } m_c, m_d \in A_j \wedge \sup(A_j) > \text{minSup}\}$$

$$M^{(k)} = \cup_{A_j \in A(k)} A_j$$

The observation information processing apparatus 100 determines whether to stop the loop or not (Step S106). At Step S106, the observation information processing apparatus 100 stops the loop if the condition $M^{(k)} = M^{(k-1)}$ is satisfied, and does not stop the loop if the condition is not satisfied.

The observation information processing apparatus 100 updates the loop variable (Step S107) if not stopping the loop (Step S106, No) and proceeds to Step S103. The observation information processing apparatus 100 adds "1" to the loop variable "k" at Step S107.

The observation information processing apparatus 100 outputs a result (Step S108) if stopping the loop (Step S106, Yes). At Step S108, the observation information processing apparatus 100 outputs the adjacent mesh sets having confidences that are locally maximum, based on $A^{(0)}, A^{(1)}, \ldots,$ and $A^{(k-1)}$.

The observation information processing apparatus 100 may use the confidence of an adjacent mesh as the confidence threshold value for that adjacent mesh, instead of commonly using the minimum adjacent mesh confidence value for all of the meshes.

Next, effects of the observation information processing apparatus 100 according to the first embodiment will be described. The observation information processing apparatus 100 generates the mesh aggregation table 130f based on the data table 130a and the mesh set data 130b. The observation information processing apparatus 100 excludes the meshes having low confidences while updating, based on the adjacent mesh set data 130c and the mesh aggregation table 130f, the confidence threshold value, to thereby detect an area having the locally maximum confidence. Therefore, according to the observation information processing apparatus 100, the area having the locally maximum confidence is efficiently detectable.

Further, according to the observation information processing apparatus 100, the area having the locally maximum confidence is detectable for meshes of any shape. The above mentioned conventional techniques had limitations on the shape of the extracted areas, but according to the observation information processing apparatus 100, such limitations related to the shape are lessened.

Further, the confidence is a quantity calculated as a ratio between the number of records satisfying the conclusion part of the association rule and the number of records satisfying the condition part thereof, and the number of records satisfying the condition part of the association rule is dependent on the size of the mesh. Therefore, the confidence is the quantity calculated with respect to an area having a size and is different from a quantity calculated with respect to a spot. That is, if the confidences are calculated by predetermining the meshes, different conclusions are derived depending on the given meshes. In contrast, the observation information processing apparatus 100 includes the process of merging meshes, and thus is able to extract the areas having high confidences.

In the first embodiment, the case of extracting the areas in which many long distance taxi rides are taken has been described, but other various cases are applicable. For example, a case of extracting areas in which bicycle thefts are frequent, a case of extracting an area in which supply of electric power is needed, or a case of extracting areas in which a certain purchasing behavior is prominent is applicable.

If the areas in which bicycle thefts are frequent are to be extracted, the attribute 1 (v), the attribute 2 (w), the condition part $C_1$, and the conclusion part $C_2$ are defined as follows. If it is a bicycle, the attribute 1 (v) is set to "1", and if not, the attribute 1 (v) is set to "0". If stolen, the attribute 2 (w) is set to "1", and if not stolen, the attribute 2 (w) is set to "0". The condition part $C_1$ is a logical expression that becomes "T" if "v" is "1", and "F" if "v" is not "1". The condition part $C_2$ is a logical expression that becomes "T" if "w" is "1", and "F" if "w" is not "1". According to such definitions, the observation information processing apparatus 100 is able to detect the areas in which bicycles are inevitably stolen if parked therein, rather than simply the number of thefts. Therefore, cost effectiveness of measures such as crime prevention patrol enhancement and installation of cameras and lights is able to be improved.

If the areas in which the supply of electric power is needed are to be extracted, the attribute 1 (v), the attribute 2 (w), the condition part $C_1$, and the conclusion part $C_2$ are defined as follows. The attribute 1 (v) is an amount of sunlight, and the attribute 2 (w) is an amount of electric power consumption. The condition part $C_1$ is a logical expression that becomes "T" if "v" is small, and "F" if "v" is not small. The condition part $C_2$ is a logical expression that becomes "T" if "w" is large, and "F" if "w" is not large. According to such definitions, the observation information processing apparatus 100 is able to detect the areas in which the amounts of solar power generation are scarce with respect to the demands for electric power. Even if the amount of power generation is small, there is no problem if the demand is low, and thus such an area will not be detected.

If the areas in which a certain purchasing behavior is prominent are to be detected, the attribute 1 (v), the attribute 2 (w), the condition part $C_1$, and the conclusion part $C_2$ are defined as follows. Herein, the certain purchasing behavior is assumed to be purchase of beer and purchase of disposable diapers. If beer is purchased, the attribute 1 (v) is set to "1", and if not, the attribute 1 (v) is set to "0". If disposable diapers are purchased, the attribute 2 (w) is set to "1", and if not, the attribute 2 (w) is set to "0". The condition part $C_1$ is a logical expression that becomes" if "v" is "1", and "F" if "v" is not "1". The condition part $C_2$ is a logical expression that becomes "T" if "w" is "1", and "F" if "w" is not "1". According to such definitions, the observation information processing apparatus 100 is able to detect the areas, in which the purchasing behavior of purchasing disposable diapers if beer is also purchased is prominent. Causes and the like of this purchasing behavior may be found from regional characteristics of that area.

In the first embodiment, the association rule is given from the outside for use, but the association rule may be generated in any way. Hereinafter, various ways of generating the association rule will be described. For example, in addition to the ways of generating the association rule based on the findings of specialists like in the above described three examples, a way of generating the association rule by using a finding algorithm of an association rule may be used.

An example of the way of generating the association rule using the finding algorithm of the association rule will be described. The observation information processing apparatus 100 uses an algorithm such as Apriori for example, to find the association rule without considering positions. For Apriori, the technique described in the reference, AGRAWAL, R. and SRIKANT, R., "Fast Algorithms for Mining Association Rules", *Proc. of the 20th Int'l Conference on Very Large Databases*, Santiago, pp. 487-499, may be used.

In the first embodiment, the meshes are excluded depending on whether $s_c c_c / mins_c \geq minConf$ is satisfied or not. However, the score to be compared with minConf is not limited to $s_c c_c / mins_c$. For example, the observation information processing apparatus 100 may use "$s_c c_c / maxs_c$" or "$s_c c_c / avgs_c$" as the score.

An example of a process in which the observation information processing apparatus 100 uses the score "$s_c c_c / maxs_c$" will be described. The observation information processing apparatus 100 refers to the supports in the mesh aggregation table 130f and determines the maximum support as "$maxs_c$". The observation information processing apparatus 100 divides the value of "support×confidence" in the mesh aggregation table 130f by "$maxs_c$" to calculate "$s_c c_c / maxs_c$". The observation information processing apparatus 100 calculates "$s_c c_c / maxs_c$" for each mesh identification information.

The observation information processing apparatus 100 detects the mesh identification information for which "$s_c c_c / maxs_c$" is less than the confidence threshold value as a target to be excluded. The observation information processing apparatus 100 excludes the records corresponding to the detected mesh identification information from the mesh aggregation table 130f. The rest of the process is similar to that of the above described first embodiment. Although when the observation information processing apparatus 100 uses the score "$s_c c_c / maxs_c$", some of the local maximum areas may be overlooked because of having no basis on the later described theorem, fast detection of only those having particularly high confidences among the local maximum areas becomes possible.

An example of a process in which the observation information processing apparatus 100 uses the score "$s_c c_c / avgs_c$" will be described. The observation information processing apparatus 100 refers to the supports in the mesh aggregation table 130f and calculates an average value of the supports as "$avgs_c$". The observation information processing apparatus 100 divides the value of "support×confidence" in the mesh aggregation table 130f by "$avgs_c$" to calculate "$s_c c_c / avgs_c$". The observation information processing apparatus 100 calculates "$s_c c_c / avgs_c$" for each mesh identification information.

The observation information processing apparatus 100 detects the mesh identification information for which "$s_c c_c / avgs_c$" is less than the confidence threshold value as a target to be excluded. The observation information processing apparatus 100 excludes the records corresponding to the detected mesh identification information from the mesh aggregation table 130f. The rest of the process is similar to that of the first embodiment. When the score "$s_c c_c / avgs_c$" is used, the observation information processing apparatus 100 is able to detect the areas more faster than when the score "$s_c c_c / mins_c$" is used. Further, the local maximum areas are prevented more from being overlooked than when the score "$s_c c_c / maxs_c$" is used.

Next, grounds for the ability to detect the areas having the locally maximum confidences when "$s_c c_c / mins_c \geq minConf$" is evaluated for individual meshes will be described. Equation (1) holds for the confidence of an arbitrary mesh set "A". That is because when the left side and the right side across the inequality sign in Equation (1) are compared to each other, they differ from each other only in that the denominator on the left side has the supports summed while the denominator on the right side has the minimum support values summed. Therefore, the right side is evidently larger where the numerator common between the right side and the left side is divided by the smaller denominator.

$$conf(A) = \frac{\sum_A s_c c_c}{\sum_A s_c} \leq \frac{\sum_A s_c c_c}{|A|\min_A s_c} \quad (1)$$

The following conditions are supposed to be satisfied for mesh sets $A_+$, $A_-$, and $L$. Herein, minConf is a constant.

$$A_+ = A_- \cup L \text{ AND } A_- \cap L = \phi$$

$$conf(A_+) \geq minConf$$

The holding of $conf(A_+) < conf(A_-)$ will now be proved if $s_c c_c / \min_{A+} s_C < minConf$ FOR $\forall m_c \in L$.

The relation $conf(A_+) - conf(A_-)$ is expressible by Equation (2). Further, Equation (3) holds from Equation (1) and $s_c c_c / \min_{A+} s_C < minConf$.

$$conf(A_-) - conf(A_+) = \qquad (2)$$

$$\sum_{A_-} s_c c_c \bigg/ \sum_{A_-} s_c - \sum_{A_+} s_c c_c \bigg/ \sum_{A_+} s_c \propto \sum_{A_+} s_c \sum_{A_-} s_c c_c -$$

$$\sum_{A_-} s_c \sum_{A_+} s_c c_c = s_{A+}(sc_{A+} - sc_L) - (s_{A+} - s_L)sc_{A+} \propto$$

$$sc_{A+}/s_{A+} - sc_L/s_L \geq minConf - sc_L/s_L$$

$$sc_L/s_L \leq \frac{\sum_L s_c c_c}{|L|\min_{A+} s_c} = \frac{1}{|L|} \sum_L \frac{s_c c_c}{\min_{A+} s_c} < minConf \quad (3)$$

Further, from Equations (2) and (3), the following relation holds.

$$conf(A_-) - conf(A_+) > 0$$

Herein, "$s_{A+}$" of Equation (2) is defined as in Equation (4). Further, $sc_{A+}$ is defined as in Equation (5). Further, $s_L$ is defined as in Equation (6). Further, $sc_L$ is defined as in Equation (7).

$$s_{A+} = \Sigma_{A+} s_c \qquad (4)$$

$$sc_{A+} = \Sigma_{A+} s_c c_c \qquad (5)$$

$$s_L = \Sigma_L s_c \qquad (6)$$

$$sc_L = \Sigma_L s_c c_c \qquad (7)$$

The meaning of the theorem proved above will now be described. When the mesh set "L" to be excluded is to be found, there are many mesh combinations to be excluded from the mesh set "$A_+$", and a large calculation cost is needed to calculate Equation (2) for all of these combinations and to obtain those for which the results become positive as the mesh set "L". In contrast, evaluation of $s_c c_c / \min_{A+} s_c$ for each mesh belonging to the mesh set "$A_+$" is easy. The above theorem illustrates that the relation "$conf(A_+) < conf(A_-)$" holds with respect to the mesh set "$A_-$" that does not include the meshes satisfying the relation $s_c c_c / \min_{A+} s_c < minConf$. In other words, the meshes satisfying the relation "$s_c c_c / \min_{A+} s_c < minConf$ will not be included in the locally maximum areas. By using this property and repeatedly performing updating of "minConf" and evaluation of $s_c c_c / \min_{A+} s_c < minConf$, retrieval of every locally maximum area is ensured. A case in which only one mesh is able to be excluded with a single repetition is the least efficient case and even in this least efficient case, fast retrieval of the locally maximum areas is possible in the order of a square of the number of meshes.

[b] Second Embodiment

The observation information processing apparatus 100 according to the first embodiment has a problem that a point set included in a solution is not unique when the number of points in one mesh is other than one.

Figure 19:
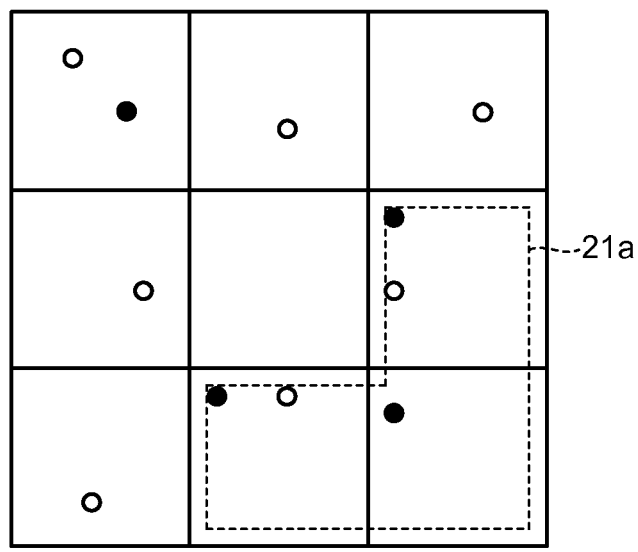
FIG. 19 is a first diagram illustrating an example of a mesh analysis.
Figure 20:
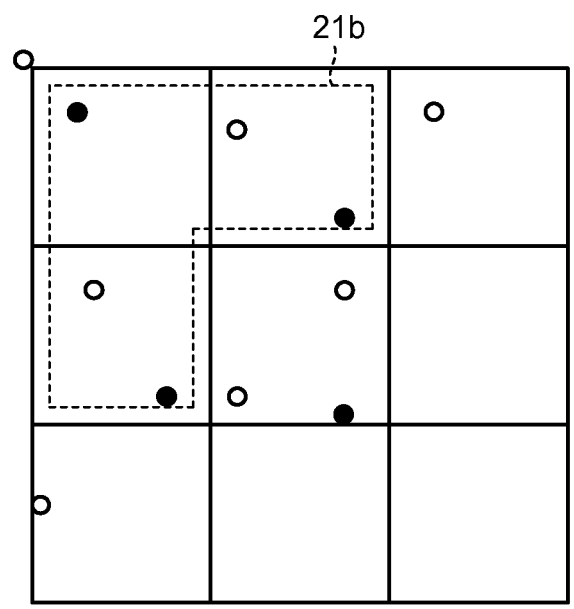
FIG. 20 is a second diagram illustrating an example of a mesh analysis.

As an example, a case where the number of black points is greater than the number of white points in an area including four or more points will be described. Hereinafter, the ratio of the number of black points to the number of white points will be referred to as "black-to-white ratio". FIGS. 19 and 20 are diagrams illustrating examples of mesh analysis.

The numbers, shapes, and sizes of the meshes are common in FIGS. 19 and 20 and the only difference is in the starting points of their meshes. Meshes like those illustrated in FIGS. 19 and 20 where only their starting points differ therebetween are able to be generated as many as desired. Just by the influence of these starting points, different results are obtained for the shape of the solution, the positions, and the point sets included therein. For example, the black-to-white ratio in a frame 21a of FIG. 19 is "1.5". The black-to-white ratio in a frame 21b of FIG. 20 is "1.5". Because all of the mesh sets are not unique, just by changing the mesh starting point, different solutions are obtained from the same data.

In order to solve the above problem, an observation information processing apparatus according to the second embodiment adopts Voronoi division for all mesh sets. By adopting Voronoi division, each mesh will have just one point. When a point set is given, Voronoi division therefor is unique.

Further, the observation information processing apparatus according to the second embodiment adopts a Delaunay graph. By adopting the Delaunay graph, determination of whether or not respective meshes are adjacent to one another becomes possible. Further, if a edge of a Delaunay graph corresponding to a pair of meshes is cut off, even if the distance among the respective meshes is small, by treating these meshes as not being adjacent to one another, the observation information processing apparatus determinates an adjacency relations among the respective meshes in consideration of obstacles.

Figure 21:
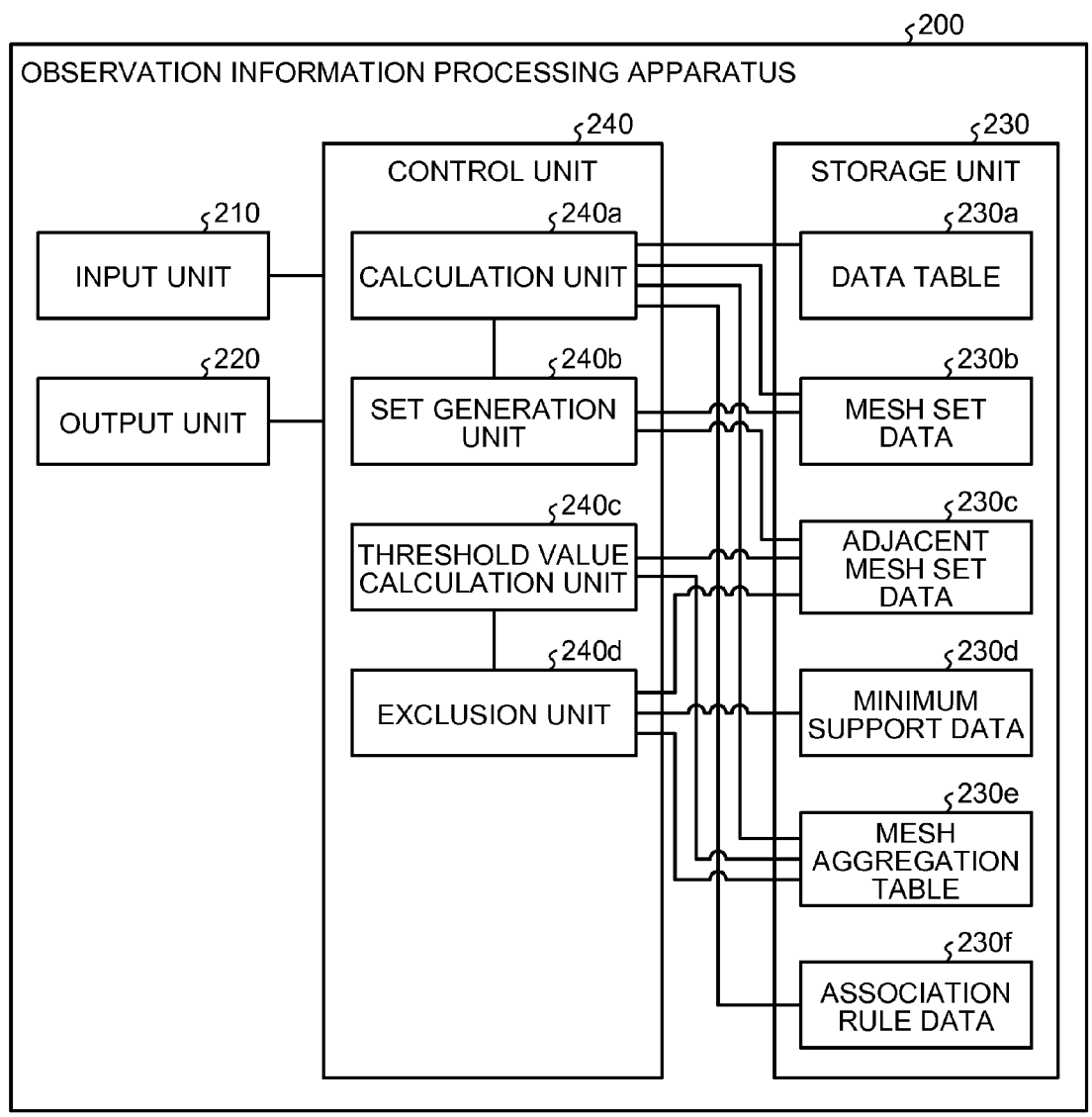
FIG. 21 is a diagram illustrating a configuration of an observation information processing apparatus according to a second embodiment of the present invention.

Next, a configuration of the observation information processing apparatus according to the second embodiment will be described. FIG. 21 is a diagram illustrating the configuration of the observation information processing apparatus according to the second embodiment. As illustrated in FIG. 21, this observation information processing apparatus 200 has an input unit 210, an output unit 220, a storage unit 230, and a control unit 240.

The description of the input unit 210 and the output unit 220 is similar to that of the input unit 110 and the output unit 120 described with reference to FIG. 1.

The storage unit 230 stores therein a data table 230a, a mesh set data 230b, and an adjacent mesh set data 230c. Further, the storage unit 230 stores therein a minimum support data 230d, a mesh aggregation table 230e, and an association rule data 230f. The storage unit 230 corresponds, for example, to a semiconductor memory element such as a RAM, a ROM, or a flash memory, or to a storage device such as a hard disk or an optical disk.

The data table 230a has a plurality of records, each record including a time (t), a set of coordinates (x, y), an attribute 1 (v), and an attribute 2 (w). For example, the data table 230a is defined as "D={(t, x, y, v, w)}". Further, "t" is defined as "t∈T(time)". Further, "x" and "y" are defined as "(x, y)∈ R²(coordinates)". Further, "v" and "w" are defined as "v, w∈Z(integer, real number, item value)". Furthermore, for the sake of explanation, the set of coordinates are defined as follows. Herein, "n" is the number of coordinate sets.

$$P=\{p_i\}=\{(x_i,y_i)|i=1,2,\ldots,n\}$$

Further, in the data table 230a according to the second embodiment, the attribute 1 (v) is always "1". The attribute 2 (w) becomes "1" when the point is black and "0" when the point is white.

Further, in the second embodiment, an association rule is defined as follows. The condition part $C_1$ becomes "T" when v=1, and "F" when v is not "1". The conclusion part $C_2$ becomes "T" when "w=1", and "T" when "w" is not "1". That is, the number of white points+the number of black points=the support. Further, the number of black points divided by the sum of the numbers of the white and black points equals the confidence. The association rule is stored in the association rule data 230f.

Further, in the second embodiment, with respect to the data table 230a, Voronoi division and a Delaunay graph are defined as follows.

$$P=\{p_i\}=\{(x_i,y_i)|i=1,2,\ldots,n\}$$

The Voronoi division is defined as $\{V(p_i)|i=1, 2, \ldots, n\}$. Herein, $V(p_i)$ is an area closer to $p_i$ than to any other points in "P" and is called a Voronoi area. Further, the boundary of a Voronoi area is called a Voronoi boundary. The point $p_i$ is called a Voronoi point.

The Delaunay graph is defined as G=(P, E). Herein, $E=\{(p_C, p_d)|$Voronoi areas $V(p_c)$ and $V(p_d)$ share a Voronoi boundary$\}$.

Figure 22:
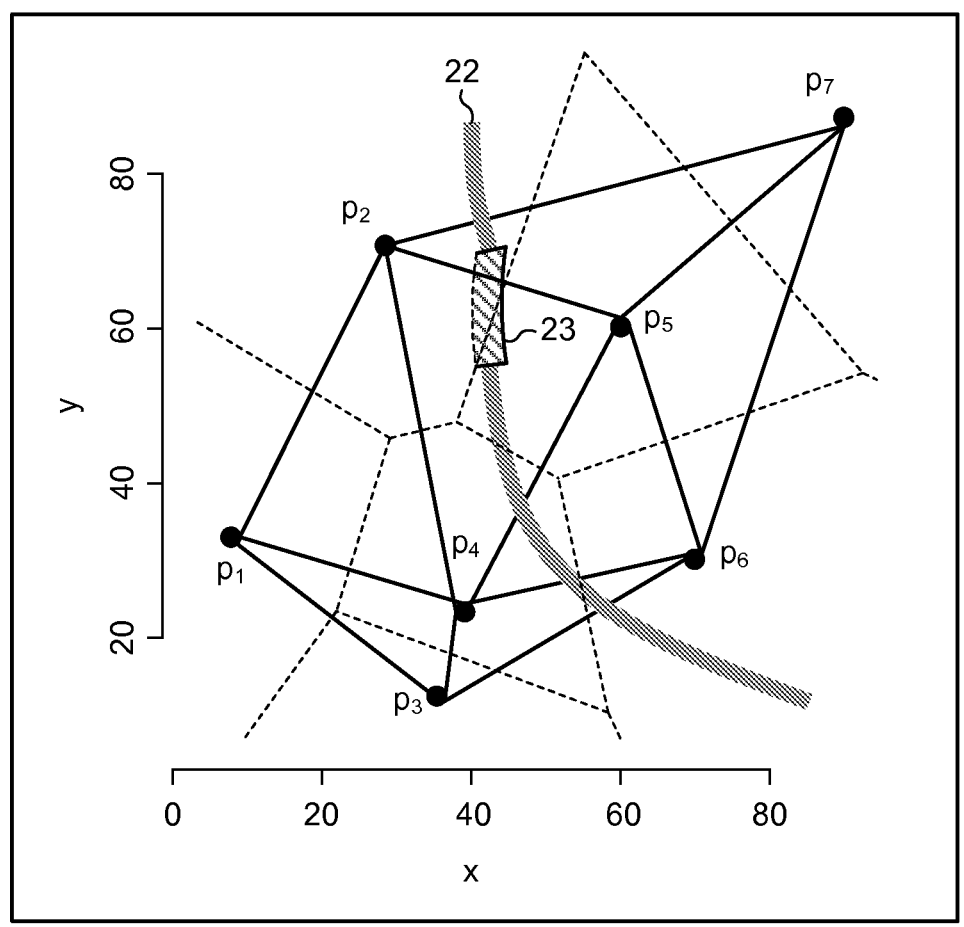
FIG. 22 is a diagram illustrating an example of Voronoi division and a Delaunay graph.

FIG. 22 is a diagram illustrating an example of the Voronoi division and the Delaunay graph. The horizontal axis represents the x-coordinate and the vertical axis represents the y-coordinate. The broken line in FIG. 22 represents the Voronoi division. The solid line in FIG. 22 represents the Delaunay graph. The example in FIG. 22 includes a river 22 and a bridge 23. Of the Delaunay graph, the edges over which an obstacle like the river 22 crosses are not used and these are treated as having no adjacency relations. In the example illustrated in FIG. 22, the Delaunay graph edges $(p_2, p_7)$, $(p_4, p_5)$, $(p_4, p_6)$, and $(p_3, p_6)$ cross over the river 22 and thus are not used.

The mesh set data 230b is a data of mesh sets. Using the Voronoi division and the Delaunay graph, a mesh set is defined as "M". Further, "$m_c \sim m_d \Leftrightarrow (p_c, p_d) \in E$". This means that if $m_c \sim m_d$, there is a Delaunay graph edge between $p_c$ and $p_d$.

The adjacent mesh set data 230c is a data of adjacent mesh sets. An adjacent mesh set is a set including only all of meshes that are reachable by following the adjacency relations. The detailed description related to the adjacent mesh set data 230c is similar to that for the adjacent mesh set data 130c illustrated in FIG. 1.

The minimum support data 230d is a data of a minimum support (minSup). A minimum support is a constant that a user presets.

The mesh aggregation table 230e is used by the later described control unit 240 upon detection of an area in which the confidence related to the association rule becomes locally maximum. FIG. 23 is a diagram illustrating an example of a data structure of a mesh aggregation table according to the second embodiment. As illustrated in FIG. 23, this mesh aggregation table 230e has mesh identification information, a support, a value of "support×confidence", and a confidence, in association with one another. Description of the mesh identification information, support, and confidence is similar to that described in the first embodiment.

If Voronoi division is used, the support and confidence for each mesh are as follows. The support of a mesh having a black point is $s_c=1$, and the confidence of a mesh having a black point is $c_c=1$. The support of a mesh having a white point is $s_c=1$, and the confidence of a mesh having a white point is $c_c=0$.

If the process by the observation information processing apparatus 100 of the first embodiment is executed with the support and confidence of each mesh set as such, transitive closure of the adjacency relation is extracted. This is because, due to the relation $\min_M s_c=1$, 0<minConf<1, only the white points satisfy the relation $s_c c_c/\min_M s_c$<minConf. Therefore, all of the meshes corresponding to the white points are filtered out and all of the meshes corresponding to the black points remain.

This is because a Voronoi area corresponding to a mesh has just one point. It is preferable that although the white and black points included in meshes are observed there by chance, for a case in which the points are moving objects, a stochastic approach is adopted and gray values are used instead of two values, to lessen the stochasticity. By performing graying, even a mesh including a white point may remain, if a mesh including a black point is present therearound Further, even a mesh including a black point may be filtered out, if a mesh including a white point is present therearound.

Figure 24:
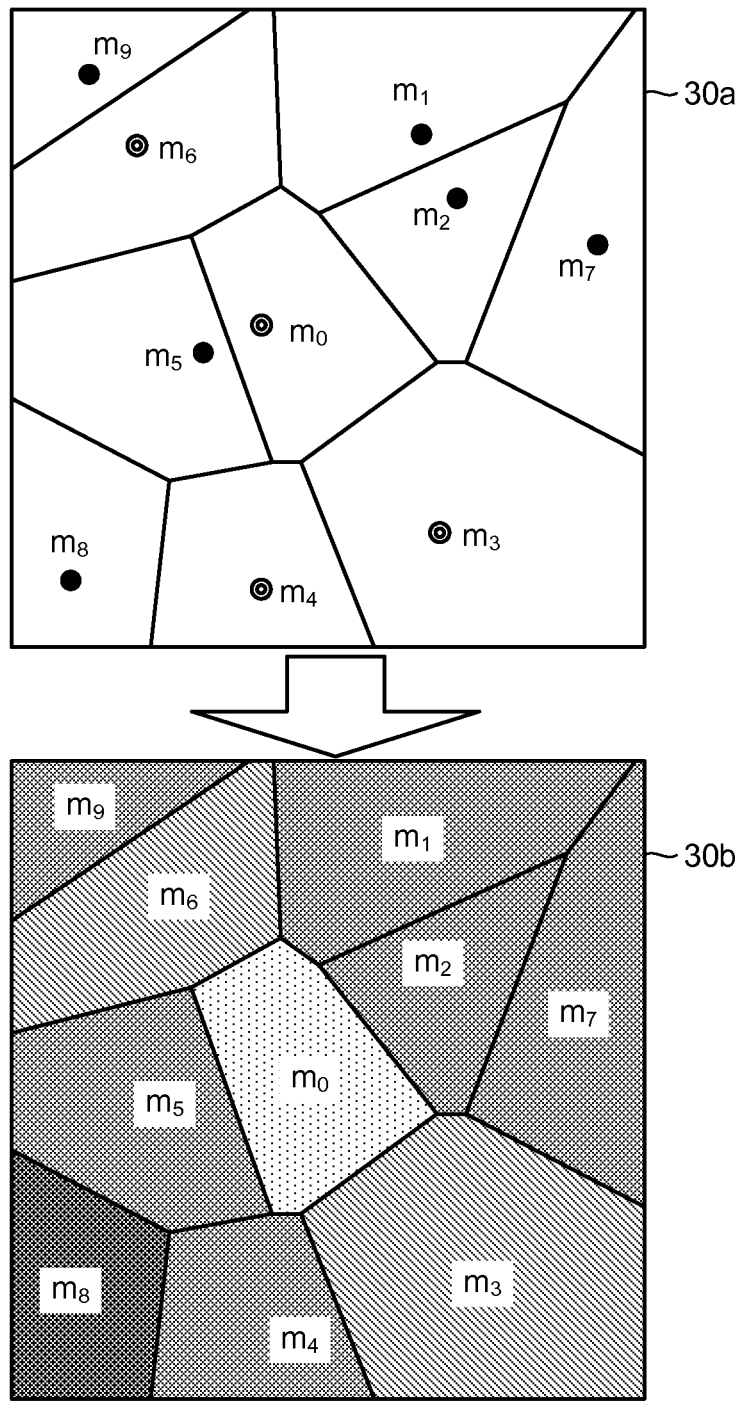
FIG. 24 is a diagram for explaining a concept of graying.

FIG. 24 is a diagram for explaining a concept of graying. An area 30a of FIG. 24 includes meshes $m_0, m_1, m_2, m_3, m_4, m_5, m_6, m_7, m_8$, and $m_9$. Of these, the meshes $m_0, m_3, m_4$, and $m_6$ are meshes each including a white point. The meshes $m_1, m_2, m_5, m_7, m_8$, and $m_9$ are meshes each including a black point. By graying, as illustrated with an area 30b in FIG. 24, the values of confidence $c_c$ of the respective meshes $m_0, m_1, m_2, m_3, m_4, m_5, m_6, m_7, m_8$, and $m_9$ become 0 to 1.

The control unit 240 has a calculation unit 240a, a set generation unit 240b, a threshold value calculation unit 240c, and an exclusion unit 240d. The control unit 240 corresponds, for example, to an integrated device such as an ASIC or FPGA. The control unit 240 corresponds, for example, to an electronic circuit such as a CPU or MPU.

The calculation unit 240a is a processing unit that executes graying of each mesh. The calculation unit 240a generates, based on the Voronoi division, the mesh set data 230b. Further, the calculation unit 240a outputs the data of the Delaunay graph to the set generation unit 240b.

Figure 25:
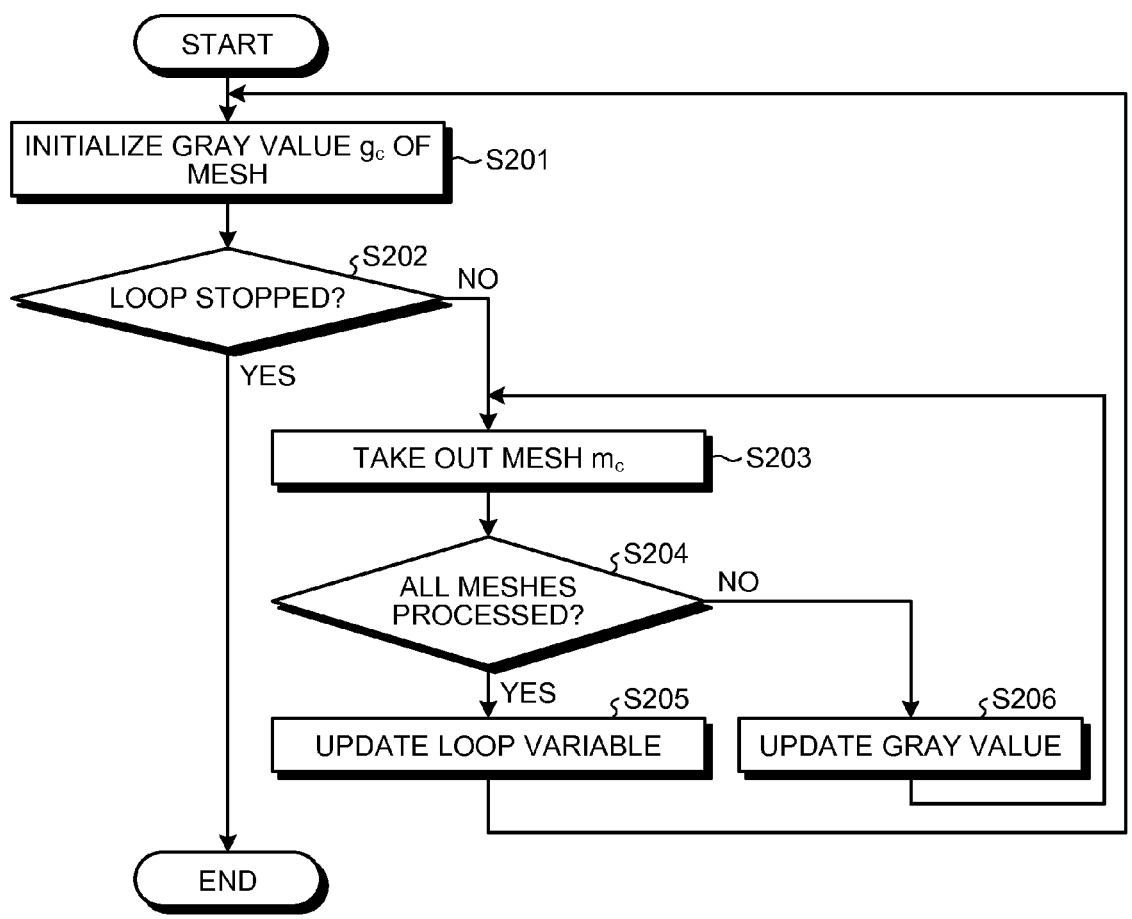
FIG. 25 is a flow chart illustrating a sequence of a process of graying.

Herein, a sequence of a graying process executed by the calculation unit 240a will be described. FIG. 25 is a flow chart illustrating the sequence of the graying process.

As illustrated in FIG. 25, the calculation unit 240a initializes a gray value $g_c$ of a mesh (Step S201). At Step S201, an initial value of a gray value of a mesh corresponding to a black point is "$g_c^{(0)}=1$". An initial value of a gray value of a mesh corresponding to a white point is "$g_c^{(0)}=0$". The superscript number attached to "g" corresponds to the number of loops and the initial value thereof is "0".

The calculation unit 240a determines whether or not to stop the loop (Step S202). At Step S202, the calculation unit 240a may stop the loop without even executing the loop once. The calculation unit 240a may stop the loop after executing the loop just once. The calculation unit 240a may stop the loop when the relation $|g_c^{(i)} - g_c^{(i-1)}| < \epsilon$ is satisfied for every $m_c$.

The calculation unit 240a, when stopping the loop (Step S202, Yes) ends the graying.

If the calculation unit 240a does not stop the loop (Step S202, No), the calculation unit 240a takes out the mesh $m_c$ (Step S203). The calculation unit 240a determines whether or not all the meshes have been processed (Step S204).

A calculation unit 240a updates the loop variable (Step S205) and proceeds to Step S201, if all of the meshes have been processed (Step S204, Yes). At Step S205, the calculation unit 240a updates the loop variable by executing i=i+1.

The calculation unit 240a updates the gray value (Step S206) and proceeds to Step S203 if not all of the meshes have been processed (Step S204, No). At Step S206, the calculation unit 240a executes "$g_c^{(i+1)} = g_c^{(i)}/3 + 2\Sigma g_d^{(i)}/3n$" to thereby update the gray value.

Herein, the meaning of $\Sigma$ will be described. In a Delaunay graph G=(P, E), $m_d$ satisfying the relation $(m_c, m_d) \in E$ is a target to be summed. The calculation unit 240a may update the gray value according to first and second modified examples described below.

The first modified example will now be explained. The calculation unit 240a may use a weighted sum. For example, if a distance between $p_c$ and $p_d$ is $\delta_{cd}$, the gray value is defined as "$g_c^{(i+1)} = \{n g_c^{(i)} + 2\Sigma w_{cd} g_d^{(i)}\}/\{n + 2\Sigma w_{cd}\}$" with $w_{cd} = 1/(1+\delta_{cd})$ being the weight. If for every $m_d$, $w_{cd} = 1$, this coincides with "$g_c^{(i+1)} = g_c^{(i)}/3 + 2\Sigma g_d^{(i)}/3n$".

The second modified example will now be explained. In the first modified example, the calculation unit 240a sets the weight to zero with respect to an adjacency relation cut off by the influence of an obstacle or the like. Setting the weight to zero means that $w_{cd}=0$.

Figure 26:
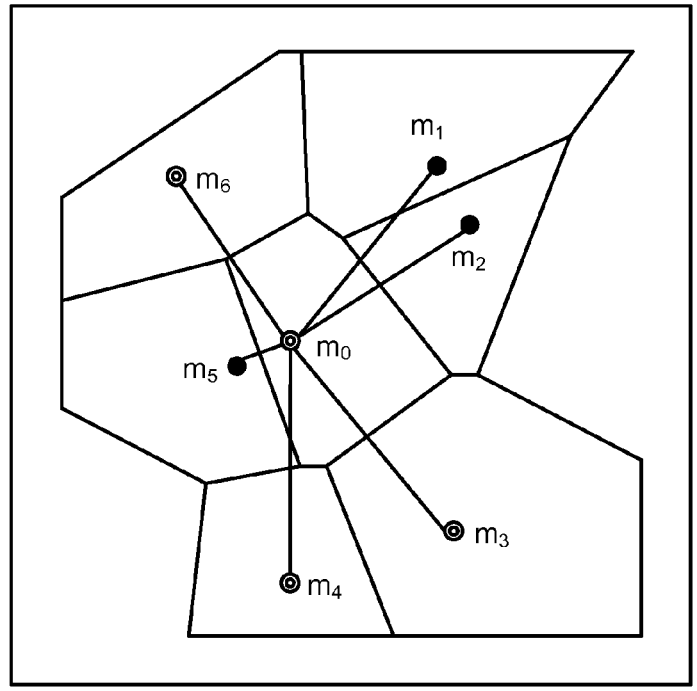
FIG. 26 is a first diagram illustrating an example of meshes to be processed by a calculation unit.

Next, a first operation example of a process, by the calculation unit 240a, of graying the meshes and generating the mesh aggregation table 230e will be explained. The calculation unit 240a executes graying according to the sequence of the process illustrated in FIG. 25, and the number of loops corresponding to Step S202 is assumed to be one. FIG. 26 is a first diagram illustrating an example of meshes to be processed by the calculation unit. As illustrated in FIG. 26, the meshes $m_1$, $m_2$, and $m_5$ are meshes each including a black point. The meshes $m_0$, $m_3$, $m_4$, and $m_6$ are meshes each including a white point. Further, the Delaunay graph connecting $m_0$ with $m_1$, $m_2$, $m_3$, $m_4$, $m_5$, and $m_6$ is not cut off by an obstacle or the like and $m_0$ has adjacency relations with $m_1$, $m_2$, $m_3$, $m_4$, $m_5$, and $m_6$.

The calculation unit 240a initializes a gray value $g_c^{(0)}$ of each mesh $m_c$. Specifically, the calculation unit 240a determines that "$g_0^{(0)}=g_3^{(0)}=g_4^{(0)}=g_6^{(0)}=0$". Further, the calculation unit 240a determines that "$g_1^{(0)}=g_2^{(0)}=g_5^{(0)}=1$". Further, the calculation unit 240a sets the loop variable "i" to zero.

The calculation unit 240a takes out $m_0$, and updates the gray value of $m_0$. The $m_0$ is adjacent to $m_1$, $m_2$, $m_3$, $m_4$, $m_5$, and $m_6$. By performing the calculation below, the calculation unit 240a updates the gray value $g_0^{(1)}$ of $m_0$ and the value of $g_0^{(1)}$ becomes "0.33".

$$g_0^{(1)} = \{(g_0^{(0)} + g_1^{(0)} + g_2^{(0)}) + (g_0^{(0)} + g_2^{(0)} + g_3^{(0)}) + (g_0^{(0)} + g_3^{(0)} + g_4^{(0)}) +$$
$$(g_0^{(0)} + g_4^{(0)} + g_5^{(0)}) + (g_0^{(0)} + g_5^{(0)} + g_6^{(0)}) + (g_0^{(0)} + g_6^{(0)} + g_1^{(0)})\}/$$
$$\{(1+1+1) + (1+1+1) + (1+1+1) + (1+1+1) +$$
$$(1+1+1) + (1+1+1)\} =$$
$$g_0^{(0)}/3 + 2(g_1^{(0)} + g_2^{(0)} g_3^{(0)} + g_4^{(0)} g_5^{(0)} + g_6^{(0)})/(3 \times 6) =$$
$$0/3 + (2 \times 3)/(3 \times 6) = 0.33$$

The calculation unit 240a updates the gray values $g_1^{(1)}$ to $g_6^{(1)}$ for $m_1$, $m_2$, $m_3$, $m_4$, $m_5$ and $m_6$ also. The calculation unit 240a generates, based on the gray value update results, the mesh aggregation table 230e. The calculation unit 240a sets the supports corresponding to the mesh identification information $m_0$ to $m_6$ of the mesh aggregation table 230e to "1". The calculation unit 240a sets the confidences corresponding to the mesh identification information $m_0$ to $m_6$ to the gray values $g_0^{(1)}$ to $g_6^{(1)}$ that have been updated. The calculation unit 240a sets the values of "support×confidence" corresponding to the mesh identification information $m_0$ to $m_6$ in the mesh aggregation table 230e by multiplying the supports by the confidences respectively.

By executing the above process, the calculation unit 240a generates the mesh aggregation table 230e.

Figure 27:
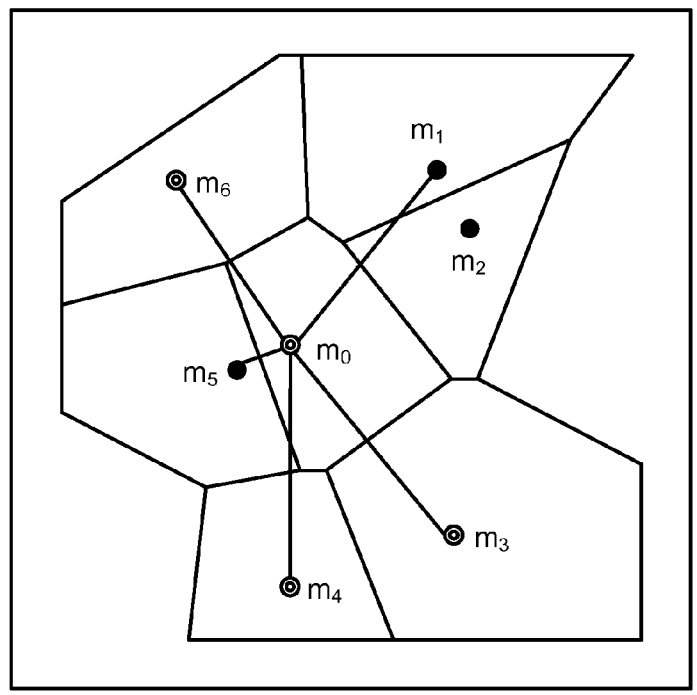
FIG. 27 is a second diagram illustrating an example of meshes to be processed by the calculation unit.

Next, a second operation example of a process, by the calculation unit 240a, of graying the meshes and generating the mesh aggregation table 230e will be explained. The calculation unit 240a executes graying according to the sequence of the process illustrated in FIG. 25, and the number of loops corresponding to Step S202 is assumed to be one. FIG. 27 is a second diagram illustrating an example of meshes to be processed by the calculation unit. As illustrated in FIG. 27, the meshes $m_1$, $m_2$, and $m_5$ are meshes each including a black point. The meshes $m_0$, $m_3$, $m_4$, and $m_6$ are meshes each including a white point. Further, a Delaunay graph connecting $m_0$ with $m_1$, $m_3$, $m_4$, $m_5$, and $m_6$ is not cut off by an obstacle or the like, and $m_0$ has adjacency relations with $m_1$, $m_3$, $m_4$, $m_5$, and $m_6$. An obstacle like a river is present between $m_0$ and $m_2$, and $m_0$ and $m_2$ are not adjacent to each other.

The calculation unit 240a initializes a gray value $g_c^{(0)}$ of each mesh $m_c$. Specifically, the calculation unit 240a determines that "$g_0^{(0)}=g_3^{(0)}=g_4^{(0)}=g_6^{(0)}$". Further, the calculation unit 240a determines that "$g_1^{(0)}=g_2^{(0)}=g_5^{(0)}=1$". Further, the calculation unit 240a sets the loop variable "i" to zero.

The calculation unit 240a takes out $m_0$, and updates the gray value of $m_0$. The $m_0$ is adjacent to $m_1$, $m_3$, $m_4$, $m_5$, and $m_6$. By performing the calculation below, the calculation unit 240a updates the gray value $g_0^{(1)}$ of $m_0$ and the value of $g_0^{(1)}$ becomes "0.25". Weights of $m_1$, $m_3$, $m_4$, $m_5$, and $m_6$ are respectively set as $w_{01}=w_{03}=w_{04}=w_{05}=w_{06}=1$. Since $m_2$ is not adjacent to $m_0$, $w_{02}=0$.

$$g_0^{(1)} = \{(g_0^{(0)} + 1 \times g_1^{(0)} + 0 \times g_2^{(0)}) + (g_0^{(0)} + 0 \times g_2^{(0)} + 1 \times g_3^{(0)}) +$$
$$(g_0^{(0)} + 1 \times g_3^{(0)} + 1 \times g_4^{(0)}) + (g_0^{(0)} + 1 \times g_4^{(0)} + 1 \times g_5^{(0)}) +$$
$$(g_0^{(0)} + 1 \times g_5^{(0)} + 1 \times g_6^{(0)}) + (g_0^{(0)} + 1 \times g_6^{(0)} + 1 \times g_1^{(0)})\}/$$

-continued $$\{(1+1+0)+(1+0+1)+(1+1+1)+(1+1+1)+$$
$$(1+1+1)+(1+1+1)\} =$$
$$\{6 \times g_0^{(0)} + 2(1 + g_1^{(0)} + 0 \times g_2^{(0)} + 1 \times g_3^{(0)} + 1 \times g_4^{(0)} + 1 \times g_5^{(0)} + 1 \times g_6^{(0)})/$$
$$\{6 + 2(1+0+1+1+1+1)\} =$$
$$\{6 \times 0 + 2(1+0+0+0+1+0)\}/(6+2 \times 5) = 4/16 = 0.25$$

The calculation unit 240a updates the gray values $g_1^{(1)}$ to $g_6^{(1)}$ for $m_1, m_2, m_3, m_4, m_5$ and $m_6$ also. The calculation unit 240a generates, based on the gray value update results, the mesh aggregation table 230e. The calculation unit 240a sets the supports corresponding to the mesh identification information $m_0, m_1, m_2, m_3, m_4, m_5$, and $m_6$ in the mesh aggregation table 230e to "1". Further, the calculation unit 240a sets the confidences corresponding to $m_0, m_1, m_2, m_3, m_4, m_5$, and $m_6$ to the gray values $g_0^{(1)}$ to $g_6^{(1)}$ that have been updated. Further, by multiplying the supports by the confidences respectively, the calculation unit 240a sets the values of "support×confidence" corresponding to the mesh identification information $m_0, m_1, m_2, m_3, m_4, m_5$, and $m_6$ in the mesh aggregation table 230e.

By executing the above process, the calculation unit 240a generates the mesh aggregation table 230e. Further, using a similar technique to that of the first embodiment, the calculation unit 240a calculates, using the association rule data 230f, the supports, the values of "support×confidence", and the confidences, and stores them in the mesh aggregation table 230e.

The set generation unit 240b is a processing unit that generates the adjacent mesh set data 230c. For example, the set generation unit 240b determines, based on the mesh set data 230b, the Delaunay graph data, and a map data, the adjacency relation of each mesh and generates the adjacent mesh set data 230c. For example, if there is no obstacle among the respective meshes, the meshes $m_0, m_1, m_2, m_3, m_4, m_5$, and $m_6$ are classified into a same group.

The threshold value calculation unit 240c calculates, based on the adjacent mesh set data 230c and the mesh aggregation table 230e, the confidence for each adjacent mesh set. The threshold value calculation unit 240c outputs, of all of the confidences, the minimum confidence as the confidence threshold value, to the exclusion unit 240d. Detailed description related to the threshold value calculation unit 240c is similar to that for the threshold value calculation unit 140c of the first embodiment.

The exclusion unit 240d is a processing unit that detects and excludes meshes to be excluded, based on the adjacent mesh set data 230c, the mesh aggregation table 230e, and the minimum support data 230d. Detailed description related to the exclusion unit 240d is similar to that for the exclusion unit 140d of the first embodiment.

Figure 28:
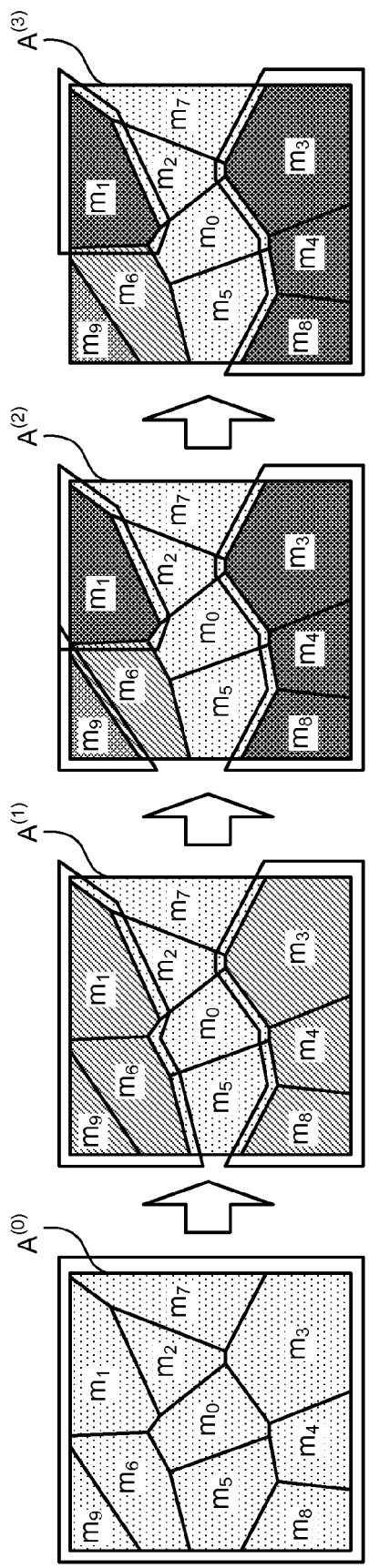
FIG. 28 is a diagram illustrating an operation example of repeatedly extracting locally maximum areas.

FIG. 28 is a diagram illustrating an operation example of repeatedly extracting the locally maximum areas. By the threshold value calculation unit 240c and the exclusion unit 240d repeatedly executing their processes, the adjacent mesh set changes in the order of $A^{(0)}, A^{(1)}, A^{(2)}$, and $A^{(3)}$.

For $A^{(0)}$, the meshes $m_0, m_1, m_2, m_3, m_4, m_5, m_6, m_7, m_8$, and $m_9$ are included in the same group.

For $A^{(1)}$, the meshes $m_1, m_6$, and $m_9$ are included in the same group. Further, for $A^{(1)}$, the meshes $m_3, m_4$, and $m_8$ are included in the same group. The meshes $m_0, m_2, m_5$, and $m_7$ are excluded.

For $A^{(2)}$, the group of the mesh $m_1$, the group of the mesh $m_9$, and the group of the meshes $m_3, m_4$, and $m_8$ exist. The mesh $m_6$ is excluded.

For $A^{(3)}$, the group of the mesh $m_1$ and the group of the meshes $m_3, m_4$, and $m_8$ exist. The mesh $m_9$ is excluded.

Figure 29:
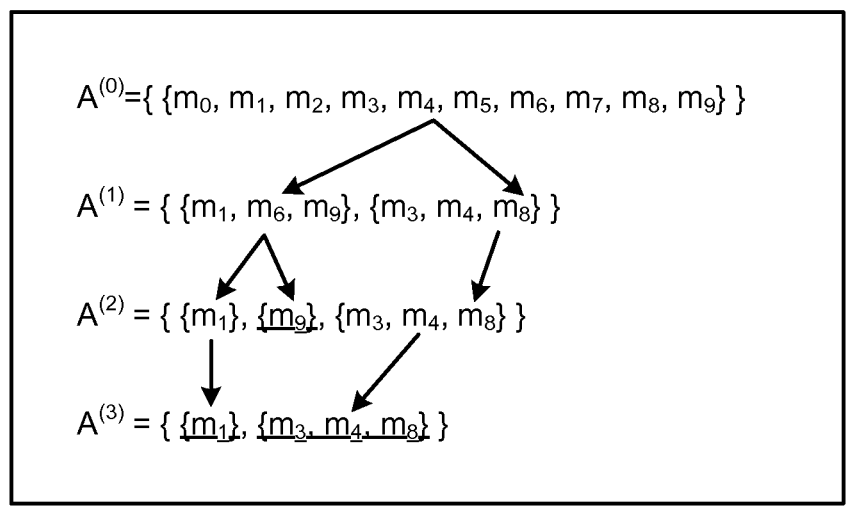
FIG. 29 is a diagram illustrating an example of inclusive relations.

As illustrated in FIG. 29, $A^{(0)}, A^{(1)}, A^{(2)}$, and $A^{(3)}$ form a tree structure by their inclusive relations. FIG. 29 is a diagram illustrating an example of the inclusion relations. In FIG. 29, the set at the base of an arrow includes the sets at the tip of the arrow. The adjacent mesh set corresponding to the leaf of the tree obtained as a result of executing the above process is the area having the confidence at a local maximum. In the example illustrated in FIG. 29, the meshes $m_1, m_3, m_4$, and $m_9$ are the areas of locally maximum confidences. The control unit 240 outputs the meshes of the areas of locally maximum confidences to the output unit 220.

Next, effects of the observation information processing apparatus 200 according to the second embodiment will be described. By using the Voronoi division, the observation information processing apparatus 200 is able to treat the unique whole mesh sets and to retrieve the unique solution.

Further, by defining the adjacency relations using the Delaunay graph, the observation information processing apparatus 200 is able to formulate the gray values. Accordingly, even in a case in which two black points are not adjacent to each other when a white point is included between the two black points and Voronoi division is performed, the method of the first embodiment is usable as-is to detect the areas of locally maximum confidences. Further, the observation information processing apparatus 200 is capable of considering the geographical and spacial influences also. For example, graying considering the distance is possible. Further, graying considering an obstacle such as a river or a center divider of a road is possible.

Figure 30:
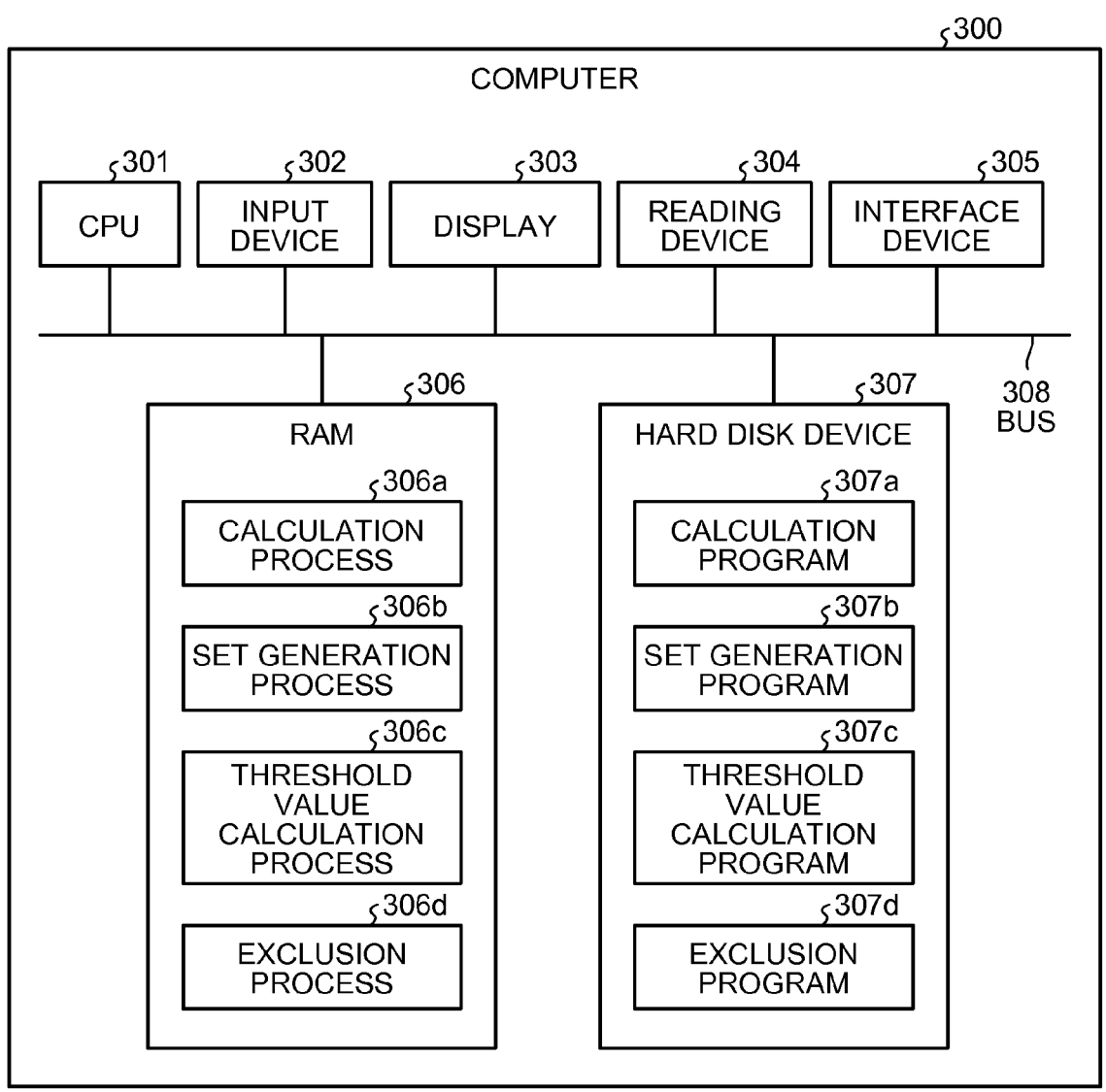
FIG. 30 is a diagram illustrating an example of a computer that executes an observation information processing program.
Figure 31:
FIG. 31 is a first diagram illustrating an example of a conventional data aggregation.
Figure 32:
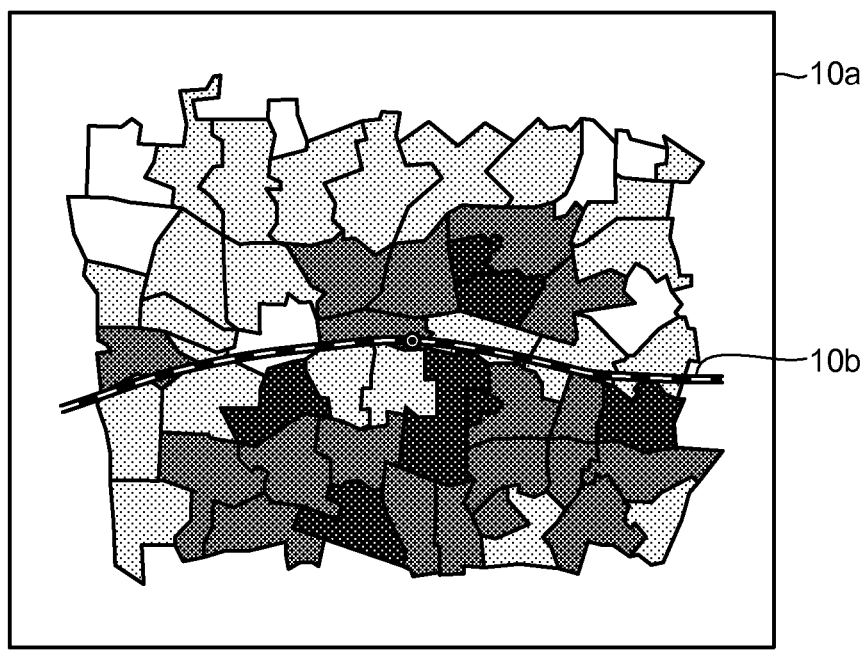
FIG. 32 is a second diagram illustrating an example of a conventional data aggregation.
Figure 33:
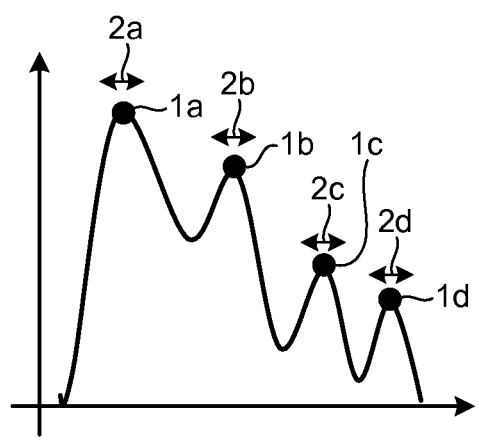
FIG. 33 is a diagram for explaining a concept of local maxima.

Next, an example of a computer that executes an information processing program realizing functions similar to those of the observation information processing apparatuses 100 and 200 according to the first and second embodiments will be explained. FIG. 30 is a diagram illustrating an example of a computer that executes an observation information processing program.

As illustrated in FIG. 30, a computer 300 has a CPU 301 that executes various operation processes, an input device 302 that receives input of data from a user, and a display 303. Further, the computer 300 has a reading device 304 that reads out a program or the like from a storage medium, and an interface device 305 that transmits and receives data to and from another computer via a network. Further, the computer 300 has a RAM 306 that temporarily stores various information and a hard disk device 307. Each of the devices 301 to 307 is connected to a bus 308.

The hard disk device 307 has a calculation program 307a, a set generation program 307b, a threshold value calculation program 307c, and an exclusion program 307d. The CPU 301 reads out each of the programs 307a to 307d and expands it in the RAM 306.

The calculation program 307a functions as a calculation process 306a. The set generation program 307b functions as a set generation process 306b. The threshold value calculation program 307c functions as a threshold value calculation process 306c. The exclusion program 307d functions as an exclusion process 306d.

For example, the calculation process 306a corresponds to the calculation unit 140a. The set generation process 306b corresponds to the set generation unit 140b. The threshold value calculation process 306c corresponds to the threshold value calculation unit 140c. The exclusion process 306d corresponds to the exclusion unit 140d.

For example, each of the programs 307a to 307d may be stored in a "portable physical medium" such as a flexible disk (FD), a CD-ROM, a DVD disk, a magneto-optical disk, or an IC card, which is inserted in the computer 300. The computer 300 may read and execute each of the programs 307a to 307e from any of these.

According to an observation information processing apparatus of the disclosure, an area having a locally maximum confidence related to an association rule is detectable.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An observation information processing apparatus, comprising:
    a memory; and
    a processor coupled to the memory, wherein the processor executes a process comprising:
        calculating, for each mesh, a support that is a number of records for which a condition part of an association rule becomes true in records included in a mesh, based on meshes each associated with records each including observation information having information identifying a geographical position and an event that occurs at the geographical position, the information being associated with the event;
        calculating, for each mesh, a confidence that is a ratio of records for which a conclusion part of the association rule also becomes true, to the records for which the condition part becomes true;
        generating an adjacent mesh set by merging adjacent ones of the meshes;
        calculating a confidence for each adjacent mesh based on the support and confidence of each mesh included in the adjacent mesh set;
        setting the smallest one of the confidences calculated as a new confidence threshold value;
        calculating, for each mesh in the adjacent mesh, a first value by multiplying the support and the confidence;
        calculating, for each mesh, in the adjacent mesh, a second value by dividing the first value by a minimum support among the supports of the meshes;
        excluding first meshes included in the adjacent mesh set from the adjacent mesh set, the first meshes having the second value which is smaller than the confidence threshold value; and repeatedly executing each process.

2. The observation information processing apparatus according to claim 1, wherein the excluding excludes the meshes to be excluded from the meshes included in the adjacent mesh set, based on a minimum value, a maximum value, or an average value, of the supports of respective meshes included in the adjacent mesh set and a value obtained by respectively multiplying the confidences by the supports for the respective meshes.

3. The observation information processing apparatus according to claim 1, wherein the generating determines an adjacency relation for each mesh, based on a Delaunay graph, an obstacle in a map data, and the meshes each having one point by Voronoi division, and generates the adjacent mesh set.

4. A non-transitory computer-readable recording medium having stored therein a program for causing a computer to execute a observation information process comprising:
    calculating, for each mesh, a support that is a number of records for which a condition part of an association rule becomes true in records included in a mesh, based on meshes each associated with records each including observation information having information identifying a geographical position and an event that occurs at the geographical position, the information being associated with the event;
    calculating, for each mesh, a confidence that is a ratio of records for which a conclusion part of the association rule also becomes true, to the records for which the condition part becomes true;
    generating an adjacent mesh set by merging adjacent ones of the meshes;
    calculating a confidence for each adjacent mesh based on the support and confidence of each mesh included in the adjacent mesh set;
    setting the smallest one of the confidences calculated as a new confidence threshold value;
    calculating, for each mesh in the adjacent mesh, a first value by multiplying the support and the confidence;
    calculating, for each mesh, in the adjacent mesh, a second value by dividing the first value by a minimum support among the supports of the meshes;
    excluding first meshes included in the adjacent mesh set from the adjacent mesh set, the first meshes having the second value which is smaller than the confidence threshold value; and repeatedly executing each process.

5. An observation information processing method executed by a computer, the observation information processing method comprising:
    calculating, by a processor, for each mesh, a support that is a number of records for which a condition part of an association rule becomes true in records included in a mesh, based on meshes each associated with records each including observation information having information identifying a geographical position and an event that occurs at the geographical position, the information being associated with the event;
    calculating, by the processor, for each mesh, a confidence that is a ratio of records for which a conclusion part of the association rule also becomes true, to the records for which the condition part becomes true;
    generating, by the processor, an adjacent mesh set by merging adjacent ones of the meshes;
    calculating, by the processor, a confidence for each adjacent mesh based on the support and confidence of each mesh included in the adjacent mesh set;
    setting, by the processor, the smallest one of the confidences calculated as a new confidence threshold value;
    calculating, by the processor, for each mesh in the adjacent mesh, a first value by multiplying the support and the confidence;
    calculating, by the processor, for each mesh, in the adjacent mesh, a second value by dividing the first value by a minimum support among the supports of the meshes;
    excluding, by the processor, first meshes included in the adjacent mesh set from the adjacent mesh set, the first meshes having the second value which is smaller than the confidence threshold value; and repeatedly executing each process.

* * * * *